US012688633B2

(12) United States Patent
Lu et al.

(10) Patent No.: US 12,688,633 B2
(45) Date of Patent: Jul. 21, 2026

(54) APPARATUS AND METHOD FOR DEEP-LEARNING-BASED SCATTER ESTIMATION AND CORRECTION

(71) Applicant: CANON KABUSHIKI KAISHA, Tokyo (JP)

(72) Inventors: Yujie Lu, Vernon Hills, IL (US); Liang Cai, Vernon Hills, IL (US); Jian Zhou, Buffalo Grove, IL (US)

(73) Assignee: Canon Kabushiki Kaisha, Tokyo (JP)

( * ) Notice: Subject to any disclaimer, the term of this patent is extended or adjusted under 35 U.S.C. 154(b) by 496 days.

(21) Appl. No.: 18/049,953

(22) Filed: Oct. 26, 2022

(65) Prior Publication Data

US 2024/0144551 A1 May 2, 2024

(51) Int. Cl.
*G06T 12/10* (2026.01)
*G06T 7/00* (2017.01)

(52) U.S. Cl.
CPC ............ *G06T 12/10* (2026.01); *G06T 7/0012* (2013.01); *G06T 2207/10081* (2013.01); *G06T 2207/20081* (2013.01); *G06T 2207/20084* (2013.01); *G06T 2207/30008* (2013.01)

(58) Field of Classification Search
CPC ................. G06T 11/005; G06T 7/0012; G06T 2207/10081; G06T 2207/20081; G06T 2207/20084; G06T 2207/30008
See application file for complete search history.

(56) References Cited

U.S. PATENT DOCUMENTS

| | | | |
|---|---|---|---|
| 6,256,367 B1 | 7/2001 | Vartanian | |
| 6,609,021 B1 | 8/2003 | Fan | |
| 8,135,111 B2 | 3/2012 | Jaffray | |
| 8,483,471 B2 | 7/2013 | Wu | |
| 9,070,181 B2 | 6/2015 | Wu | |
| 9,159,124 B2 | 10/2015 | Goshen | |
| 9,798,751 B2 | 10/2017 | Birdwell | |
| 10,140,544 B1 | 11/2018 | Zhao | |
| 10,446,262 B2 | 10/2019 | Fält | |

(Continued)

FOREIGN PATENT DOCUMENTS

| | | |
|---|---|---|
| CN | 104616251 A | 5/2015 |
| CN | 105574828 A | 5/2016 |

(Continued)

OTHER PUBLICATIONS

Yang Lei et al., Male pelvic multi-organ segmentation on transrectal ultrasound using anchor-free mask CNN, Med. Phys. 48 (6), Jun. 2021.

(Continued)

*Primary Examiner* — Matthew C Bella
*Assistant Examiner* — Jinsu Hwang
(74) *Attorney, Agent, or Firm* — Canon U.S.A., Inc. IP Division

(57) ABSTRACT

According to some embodiments, a method comprises obtaining a set of projection data acquired from a CT scan of an object; generating, based on the set of projection data, one or more sets of preliminary scattering data; and performing X-ray scatter correction by inputting the obtained set of projection data and the generated one or more sets of preliminary scattering data into a trained machine-learning model for extracting X-ray scatter components from the set of projection data.

20 Claims, 16 Drawing Sheets

(56) References Cited

U.S. PATENT DOCUMENTS

| | | | |
|---|---|---|---|
| 10,542,944 | B2 | 1/2020 | Petersilka |
| 10,593,070 | B2 | 3/2020 | Lu |
| 10,734,116 | B2 | 8/2020 | Chen |
| 10,937,206 | B2 | 3/2021 | Lu |
| 10,970,887 | B2 | 4/2021 | Wang |
| 11,182,895 | B2 | 11/2021 | Honkala |
| 2014/0153691 | A1 | 6/2014 | Kurochi et al. |
| 2018/0018757 | A1 | 1/2018 | Suzuki |
| 2018/0146935 | A1* | 5/2018 | Song .................... A61B 6/4014 |
| 2018/0330233 | A1* | 11/2018 | Rui ........................ G06N 3/084 |
| 2019/0066268 | A1 | 2/2019 | Song |
| 2019/0104940 | A1 | 4/2019 | Zhou |
| 2019/0197740 | A1 | 6/2019 | Lu |
| 2020/0234471 | A1 | 7/2020 | Lu |
| 2020/0273214 | A1 | 8/2020 | Xu |
| 2020/0279410 | A1 | 9/2020 | Lee |
| 2020/0340932 | A1 | 10/2020 | Lu |
| 2021/0003652 | A1 | 1/2021 | Zeller |
| 2021/0007695 | A1 | 1/2021 | Lu |
| 2021/0059625 | A1 | 3/2021 | Bai |
| 2021/0121149 | A1 | 4/2021 | Manhart |
| 2021/0192809 | A1 | 6/2021 | Paysan et al. |
| 2021/0282732 | A1 | 9/2021 | Qi |

FOREIGN PATENT DOCUMENTS

| | | | | |
|---|---|---|---|---|
| CN | 110009614 | A | * 7/2019 | ......... G01N 21/8851 |
| CN | 110197516 | A | 9/2019 | |
| CN | 110660111 | A | 1/2020 | |
| CN | 111325686 | A | 6/2020 | |
| CN | 113096211 | A | 7/2021 | |
| CN | 113256753 | A | 8/2021 | |
| KR | 20200059712 | A | 5/2020 | |
| WO | 2021004157 | A1 | 1/2021 | |

OTHER PUBLICATIONS

Ernst-Peter Ruhrschopf et al., A general framework and review of scatter correction methods in x-ray cone-beam computerized tomography. Part 1: Scatter compensation approaches, Jun. 2011.

Ernst-Peter Ruhrschopf et al., A general framework and review of scatter correction methods in cone beam CT. Part 2: Scatter estimation approaches, Aug. 2011.

M Sun et al., Improved scatter correction using adaptive scatter kernel superposition, Phys. Med. Biol. 55 (2010) 6695-6720, Oct. 2010.

Yu Zou et al., A Physics-based Fast Approach to Scatter Correction for Large Cone Angle Computed Tomographic Systems, 2011 IEEE Nuclear Science Symposium Conference Record, Nov. 2011.

Wojciech Zbijewski et al., Efficient Monte Carlo Based Scatter Artifact Reduction in Cone-Beam Micro-CT, IEEE Transactions on Medical Imaging, vol. 25, No. 7, Jul. 2006.

Mingshan Sun et al., Rapid Scatter Estimation for CBCT using the Boltzmann Transport Equation, Medical Imaging 2014: Physics of Medical Imaging, Mar. 2014.

Weiguang Yao et al., An analytical approach to estimating the first order x-ray scatter in heterogeneous medium, Med. Phys. 36 (7), Jun. 2009.

Shiyu Xu et al., Deep residual learning in CT physics: scatter correction for spectral CT, Nov. 2017.

Joscha Maier et al., Deep scatter estimation (DSE): feasibility of using a deep convolutional neural network for realtime x-ray scatter prediction in conebeam CT, Proc. SPIE 10573, Medical Imaging 2018: Physics of Medical Imaging, 105731L, Mar. 2018.

Yangkang Jiang et al., Scatter correction of cone-beam CT using a deep residual convolution neural network (DRCNN), Phys. Med. Biol. 64 (2019), Jul. 2019.

Hua Qian et al., Deep Learning Models for PET Scatter Estimations, 2017 IEEE Nuclear Science Symposium and Medical Imaging Conference (NSS/MIC), Oct. 2017.

A. Werling et al., Fast implementation of the single scatter simulation algorithm and its use in iterative image reconstruction of PET data, Physics in Medicine and Biology, Institute of Physics Publishing, Bristol, GB, vol. 47, No. 16, Aug. 2002 (2002-08), pp. 2947-2960, XP002318421.

Extended European Search Report for Application No. 23205894.1, European Patent Office, Mar. 22, 2024.

* cited by examiner

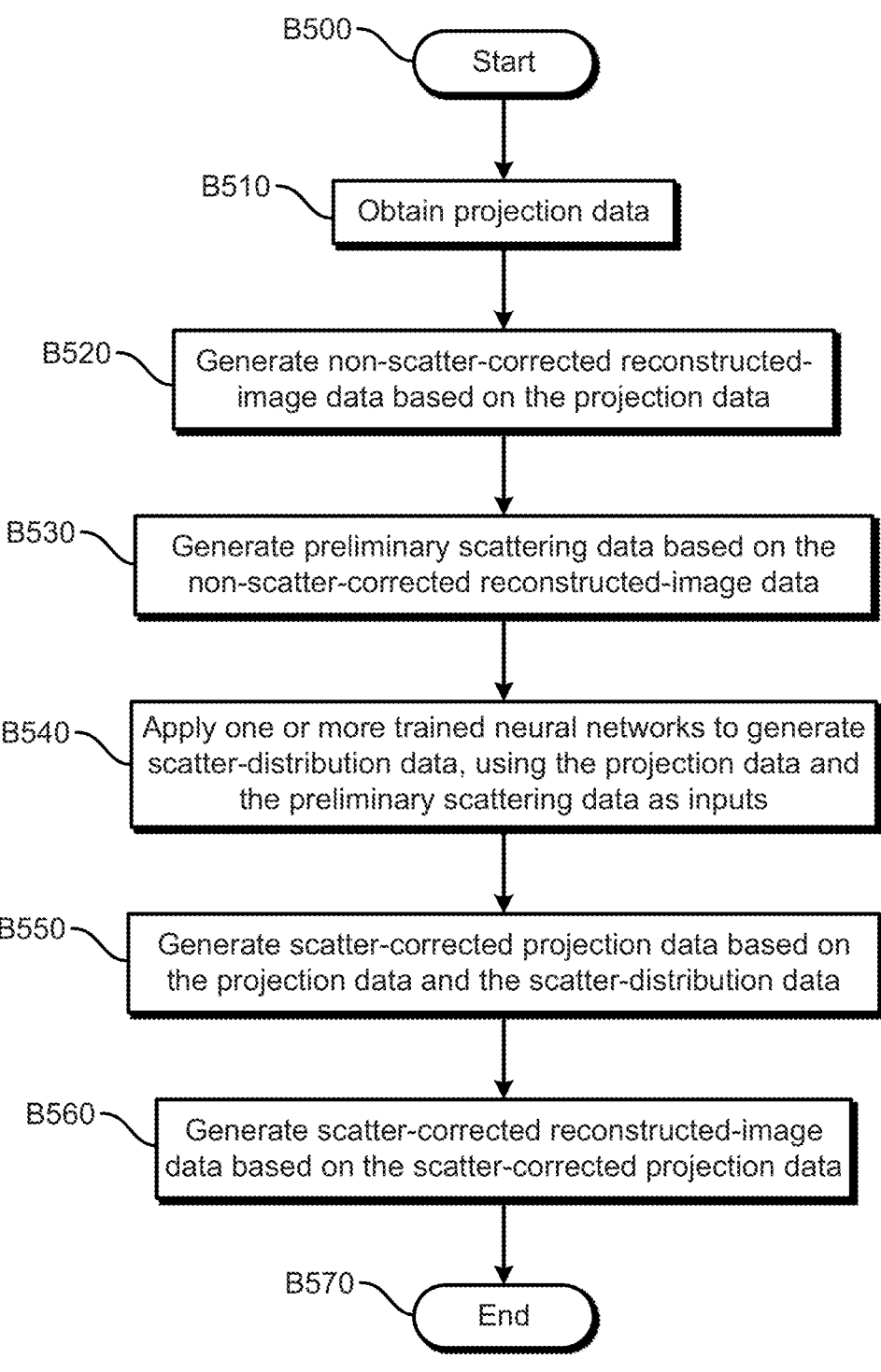

B500 — Start

B510 — Obtain projection data

B520 — Generate non-scatter-corrected reconstructed-image data based on the projection data B530 — Generate preliminary scattering data based on the non-scatter-corrected reconstructed-image data B540 — Apply one or more trained neural networks to generate scatter-distribution data, using the projection data and the preliminary scattering data as inputs B550 — Generate scatter-corrected projection data based on the projection data and the scatter-distribution data B560 — Generate scatter-corrected reconstructed-image data based on the scatter-corrected projection data B570 — End

FIG. 5

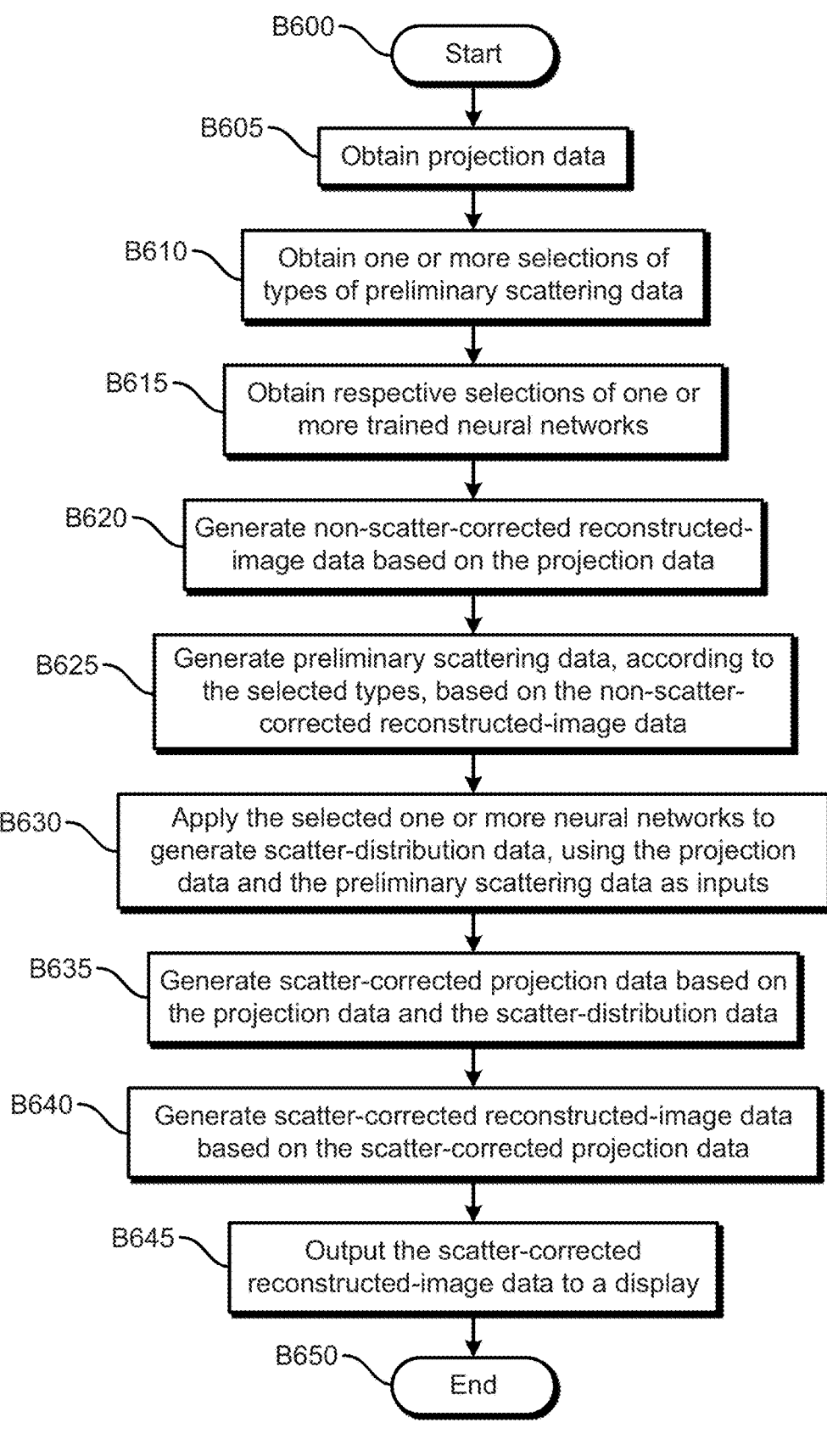

B600 — Start

B605 — Obtain projection data

B610 — Obtain one or more selections of types of preliminary scattering data

B615 — Obtain respective selections of one or more trained neural networks

B620 — Generate non-scatter-corrected reconstructed-image data based on the projection data B625 — Generate preliminary scattering data, according to the selected types, based on the non-scatter-corrected reconstructed-image data B630 — Apply the selected one or more neural networks to generate scatter-distribution data, using the projection data and the preliminary scattering data as inputs B635 — Generate scatter-corrected projection data based on the projection data and the scatter-distribution data B640 — Generate scatter-corrected reconstructed-image data based on the scatter-corrected projection data B645 — Output the scatter-corrected reconstructed-image data to a display B650 — End

FIG. 6

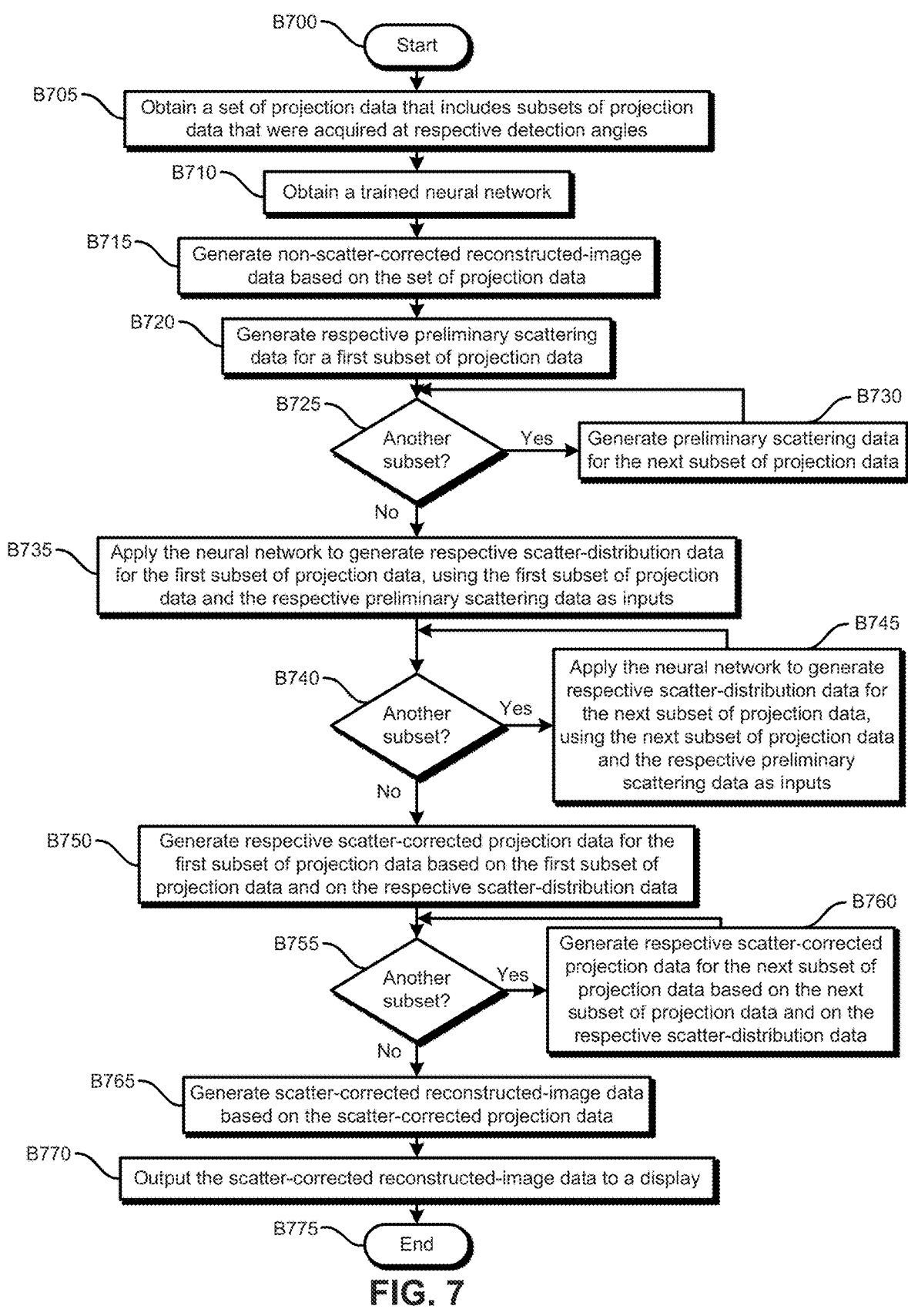

B700 — Start

B705 — Obtain a set of projection data that includes subsets of projection data that were acquired at respective detection angles B710 — Obtain a trained neural network B715 — Generate non-scatter-corrected reconstructed-image data based on the set of projection data B720 — Generate respective preliminary scattering data for a first subset of projection data B725 — Another subset? — Yes — B730 — Generate preliminary scattering data for the next subset of projection data No B735 — Apply the neural network to generate respective scatter-distribution data for the first subset of projection data, using the first subset of projection data and the respective preliminary scattering data as inputs B740 — Another subset? — Yes — B745 — Apply the neural network to generate respective scatter-distribution data for the next subset of projection data, using the next subset of projection data and the respective preliminary scattering data as inputs No B750 — Generate respective scatter-corrected projection data for the first subset of projection data based on the first subset of projection data and on the respective scatter-distribution data B755 — Another subset? — Yes — B760 — Generate respective scatter-corrected projection data for the next subset of projection data based on the next subset of projection data and on the respective scatter-distribution data No B765 — Generate scatter-corrected reconstructed-image data based on the scatter-corrected projection data B770 — Output the scatter-corrected reconstructed-image data to a display B775 — End

FIG. 7

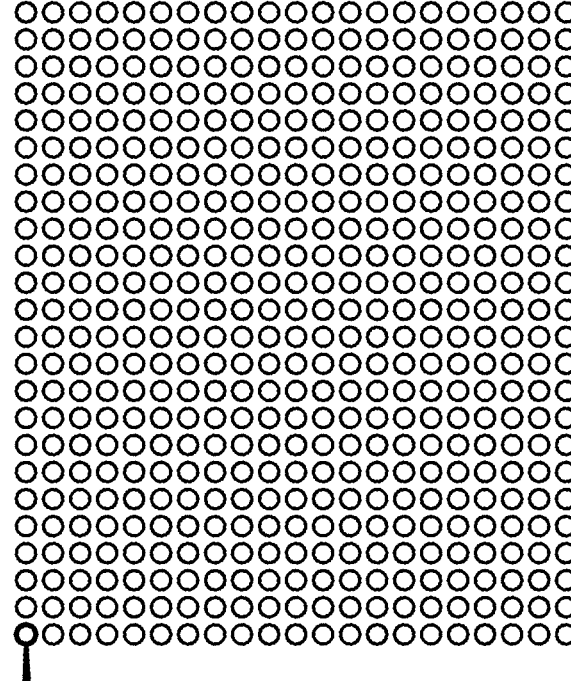
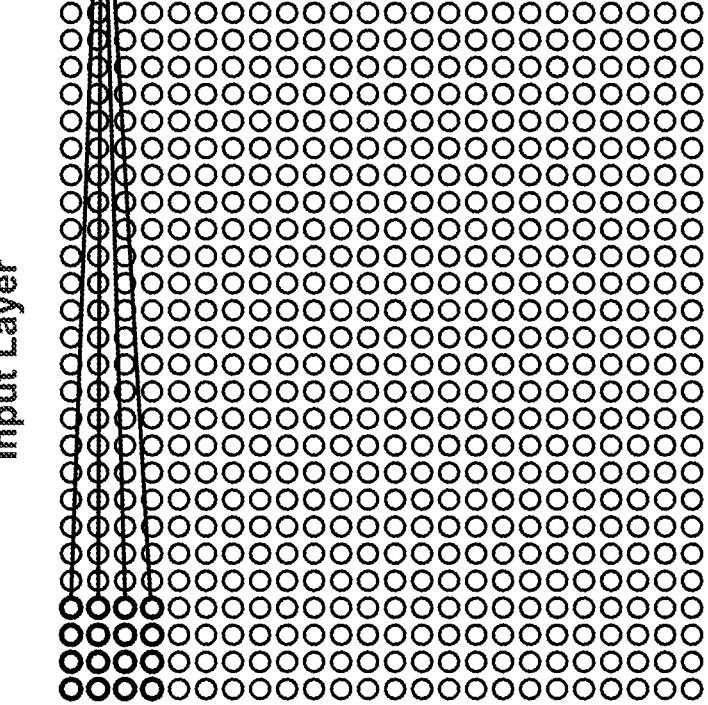
FIG. 12

APPARATUS AND METHOD FOR DEEP-LEARNING-BASED SCATTER ESTIMATION AND CORRECTION

FIELD

This application generally concerns using machine learning and artificial neural networks for scatter estimation and correction in radiographic imaging.

BACKGROUND

Radiographic imaging can produce (e.g., reconstruct) images of an object's internal structures, such as the internal members of a patient's body. For example, computed tomography (CT) scans use multiple X-ray images of an object, which were taken from different angles, to reconstruct volume images of the interior of the object.

However, X-ray scatter can degrade the quality of reconstructed images.

BRIEF DESCRIPTION OF THE DRAWINGS

FIG. 5 illustrates an example embodiment of an image-reconstruction process.

FIG. 6 illustrates an example embodiment of an image-reconstruction process.

FIG. 7 illustrates an example embodiment of an image-reconstruction process.

FIG. 12 illustrates an example of implementing a convolution layer for one neuronal node of the convolution layer, according to an example embodiment.

DETAILED DESCRIPTION

Figure 1:
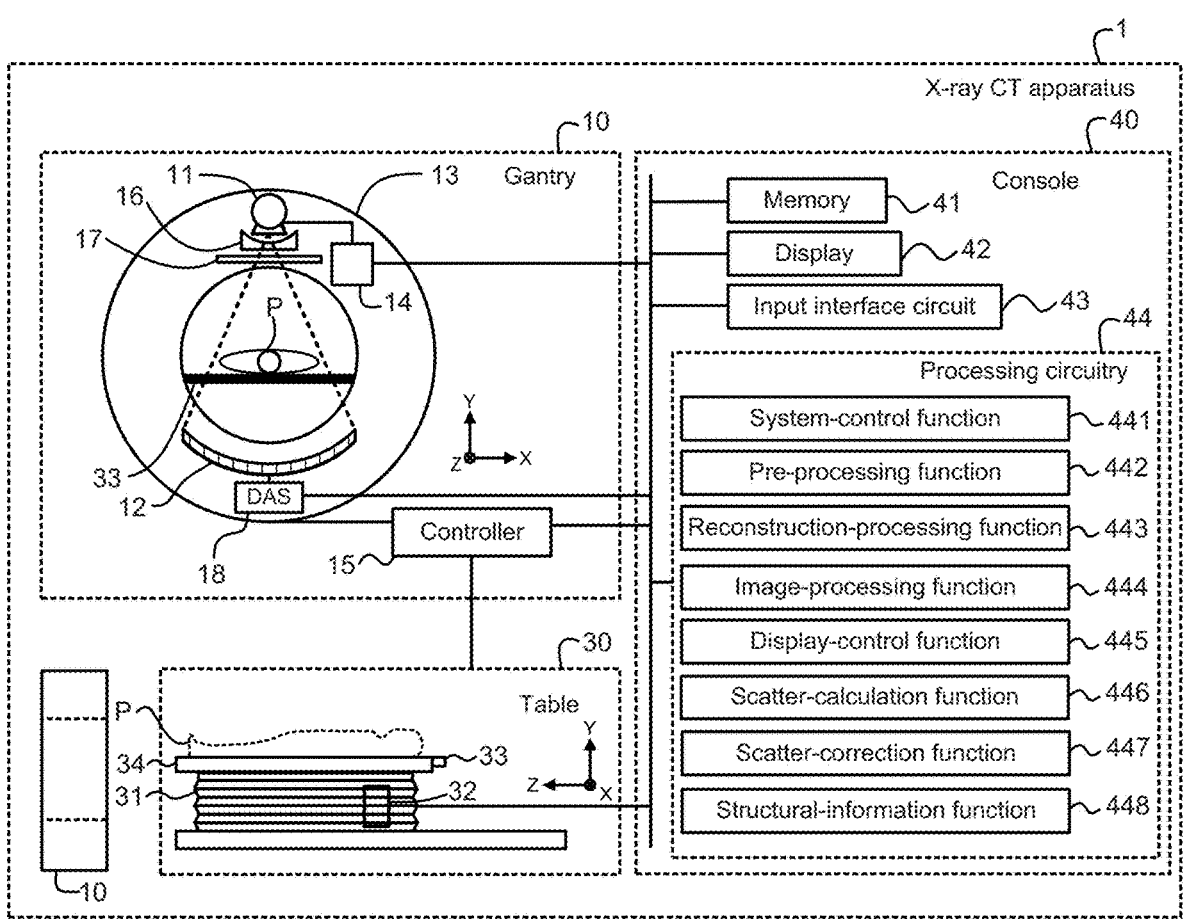
FIG. 1 illustrates an example embodiment of a medical-imaging apparatus.

The following paragraphs describe certain explanatory embodiments. Other embodiments may include alternatives, equivalents, and modifications. Additionally, the explanatory embodiments may include several novel features, and a particular feature may not be essential to some embodiments of the devices, systems, and methods that are described herein. Furthermore, some embodiments include features from two or more of the following explanatory embodiments.

Also, as used herein, the conjunction "or" generally refers to an inclusive "or," although "or" may refer to an exclusive "or" if expressly indicated or if the context indicates that the "or" must be an exclusive "or."

And in the following description and in the drawings, like reference numerals designate identical or corresponding members throughout the several views.

Additionally, some embodiments are set forth in the following paragraphs:

(1) A method for performing X-ray scatter correction for CT images, the method comprising obtaining a set of projection data acquired from a CT scan of an object; generating, based on the set of projection data, one or more sets of preliminary scattering data; and performing X-ray scatter correction by inputting the obtained set of projection data and the generated one or more sets of preliminary scattering data into a trained machine-learning model for extracting X-ray scatter components from the set of projection data.

(2) The method of (1), wherein generating the one or more sets of preliminary scattering data includes generating a reconstructed image of the object based on the set of projection data, and wherein generating the one or more sets of preliminary scattering data is based on the reconstructed image of the object.

(3) The method of (1), wherein the set of projection data includes subsets of projection data, wherein each subset of the subsets of projection data was acquired at a respective detection angle, and wherein the one or more sets of preliminary scattering data include a respective set of preliminary scattering data for each detection angle.

(4) The method of (3), wherein the trained machine-learning model outputs a respective scatter-distribution data for each subset of the subsets of projection data.

(5) The method of (4), wherein performing X-ray scatter correction includes correcting each subset of the subsets of projection data based on the respective scatter-distribution data of the subset.

(6) The method of (1), wherein the one or more sets of preliminary scattering data include one or more sets of first-scatter distributions.

(7) The method of (1), wherein the one or more sets of preliminary scattering data include one or more structure-mask projections.

(8) An X-ray imaging apparatus comprising an X-ray tube; an X-ray detector; and one or more memories and processing circuitry configured to obtain a set of projection data acquired from a CT scan of an object; generate, based on the set of projection data, one or more sets of preliminary scattering data; and perform X-ray scatter correction by inputting the obtained set of projection data and the generated one or more sets of preliminary scattering data into a trained neural network for extracting X-ray scatter components from the set of projection data.

(9) The X-ray imaging apparatus of (8), wherein, to generate the one or more sets of preliminary scattering data, the one or more memories and processing circuitry are further configured to generate a reconstructed image of the object based on the set of projection data, and generate the one or more sets of preliminary scattering data based on the reconstructed image of the object.

(10) The X-ray imaging apparatus of (8), wherein the set of projection data includes subsets of projection data, wherein each subset of the subsets of projection data was acquired at a respective detection angle, and wherein the one or more sets of preliminary scattering data include a respective set of preliminary scattering data for each detection angle.

(11) The X-ray imaging apparatus of (10), wherein the trained neural network outputs a respective scatter-distribution data for each subset of the subsets of projection data.

(12) The X-ray imaging apparatus of (11), wherein, to perform the X-ray scatter correction, the one or more memories and processing circuitry are further configured to correct each subset of the subsets of projection data based on the respective scatter-distribution data of the subset.

(13) The X-ray imaging apparatus of (10), wherein the one or more sets of preliminary scattering data include one or more sets of first-scatter distributions.

(14) The X-ray imaging apparatus of (10), wherein the one or more sets of preliminary scattering data include one or more structure-mask projections.

(15) A medical image processing apparatus comprising one or more memories and processing circuitry configured to obtain a set of projection data acquired from a CT scan of an object; generate, based on the set of projection data, one or more sets of preliminary scattering data; and perform X-ray scatter correction by inputting the obtained set of projection data and the generated one or more sets of preliminary scattering data into a trained neural network for extracting X-ray scatter components from the set of projection data.

(16) The medical image processing apparatus of (15), wherein the trained neural network operates in a projection space, and wherein the projection data in the set of projection data are defined in the projection space.

(17) The medical image processing apparatus of (15), wherein the one or more sets of preliminary scattering data include one or more sets of first-scatter distributions or one or more structure-mask projections.

(18) The medical image processing apparatus of (15), wherein the one or more sets of preliminary scattering data are defined in the projection space, and wherein the projection data in the set of projection data are defined in the projection space.

(19) The medical image processing apparatus of (15), wherein, to generate the one or more sets of preliminary scattering data, the one or more memories and the processing circuitry are further configured to generate a reconstructed image of the object based on the set of projection data, and generate the one or more sets of preliminary scattering data based on the reconstructed image of the object.

(20) The medical image processing apparatus of (19), wherein the set of projection data includes subsets of projection data, wherein each subset of the subsets of projection data was acquired at a respective detection angle, and wherein the one or more sets of preliminary scattering data include a respective set of preliminary scattering data for each detection angle.

FIG. 1 illustrates an example embodiment of a medical-imaging apparatus. In this example embodiment, the medical-imaging apparatus is an X-ray CT apparatus 1.

The X-ray CT apparatus 1 generates projection data (e.g., a sinogram) by scanning a subject P (e.g., patient) during a CT scan, generates medical images (CT images) of the subject P based on the projection data, and displays the medical images on a display 42. Also, the X-ray CT apparatus 1 calculates the X-ray scatter (e.g., calculates estimations or approximations of the X-ray scatter) and removes or reduces the scatter in the generated medical images. In CT imaging, scattered X-rays that are detected by a detector can reduce image quality. Thus, by calculating the X-ray scatter and by reducing or eliminating the X-ray scatter in the medical images, the X-ray CT apparatus 1 improves the quality of the medical images.

The X-ray CT apparatus 1 includes one or more gantries 10, one or more tables 30, and a console 40. Although, for purposes of explanation, the X-ray CT apparatus 1 in FIG. 1 includes two gantries 10 and two tables 30, some embodiments include more or fewer gantries 10 and tables 30. For example, some embodiments of the X-ray CT apparatus 1 include only one gantry 10 and only one table 30.

Also, in FIG. 1, the rotation axis of a rotation frame 13 in a non-tilted state is defined as a Z-axis direction; a direction orthogonal to the Z-axis direction and extending from the rotation center to a post that supports the rotation frame 13 is defined as an X-axis direction; and the direction orthogonal to the Z-axis and the X-axis is defined as a Y-axis direction.

Each gantry 10 includes an X-ray tube 11, an X-ray detector 12 (detector 12), a rotation frame 13, an X-ray high-voltage circuit 14, a controller 15, a wedge 16, a collimator 17, and a data-acquisition system (DAS) 18.

The X-ray tube 11 is a vacuum tube that is configured to generate the X-rays by emitting thermo electrons from a negative pole (a filament) toward a positive pole (a target), with application of high voltage from the X-ray high-voltage circuit 14. Examples of the X-ray tube 11 include a rotating anode X-ray tube by which the X-rays are generated as a result of emitting the thermo electrons onto a rotating positive pole (anode). The hardware for generating X-rays is not limited to the X-ray tube 11. For example, in place of the X-ray tube 11, a fifth-generation system, including a focus coil configured to focus electron beams generated from an electron gun, a deflection coil configured to perform electromagnetic deflection, and a target ring configured to surround a semiperimeter of the subject P and generate X-rays through collision of the deflected electron beams, may be used to generate X-rays.

The wedge 16 is a filter used for adjusting the X-ray amount radiated from the X-ray tube 11. More specifically, the wedge 16 is a filter configured to pass and attenuate the X-rays radiated from the X-ray tube 11 such that the X-rays radiated from the X-ray tube 11 onto the subject P have a predetermined distribution. For example, the wedge 16 (e.g., a wedge filter, a bow-tie filter) may be a filter obtained by processing aluminum so as to have a predetermined target angle and a predetermined thickness.

The collimator 17 is configured with lead plates or the like used for narrowing down the X-rays that have passed through the wedge 16 into the X-ray radiation range and is configured to form a slit with a combination of the plurality of lead plates or the like. The collimator 17 may be referred to as an X-ray diaphragm.

The X-ray detector 12 is configured to detect X-rays that were radiated from the X-ray tube 11 and that have passed through the subject P, and the X-ray detector 12 is configured to output electric signals corresponding to the amount of detected X-rays to the DAS 18. The X-ray detector 12 may include, for example, a plurality of rows of X-ray detecting elements, in each of which a plurality of X-ray detecting elements are arranged in a channel direction along an arc centered on a focal point of the X-ray tube 11. For example, the X-ray detector 12 may have a structure in which the plurality of rows of X-ray detecting elements, in which the plurality of X-ray detecting elements are arranged in the channel direction, are arranged in a slice direction (called a row direction). Also, each X-ray detecting element may output a respective electric signal.

The X-ray detector 12 may be, for example, a detector of an indirect conversion type including a grid (anti-scatter grid), a scintillator array, and an optical-sensor array.

The scintillator array includes a plurality of scintillators. Each of the scintillators includes a scintillator crystal that outputs light having a photon quantity corresponding to the amount of the X-rays that have become incident thereto.

The grid is disposed on the surface of the scintillator array that is positioned on the X-ray incident side, and the grid includes an X-ray blocking plate having a function of absorbing scattered X-rays. The grid may be referred to as a collimator (one dimensional collimator or two dimensional collimator).

The optical-sensor array has a function of converting the amount of light from the scintillators into an electric signal that corresponds to the amount of light from the scintillators. The optical-sensor array may include, for example, an optical sensor, such as a photomultiplier tube (PMT).

The X-ray detector 12 may be a direct-conversion detector, including a semiconductor element that converts incident X-rays into electric signals.

And some embodiments are applicable to a single-tube X-ray CT apparatus and are also applicable to an X-ray CT apparatus in which two or more pairs, that each include a respective X-ray tube 11 and X-ray detector 12, are mounted on the rotation frame 13, which may be referred to as a multi-tube X-ray CT apparatus.

In this embodiment, the X-ray tube 11 emits the X-rays in the form of a tapering beam (e.g., a rectangular pyramid, a square pyramid, a circular cone, an elliptical cone). Additionally, the X-ray detector 12 has a curved detection surface. But, in some embodiments, the X-ray tube 11 emits the X-rays in the form of parallel beams, or the X-ray detector 12 has a flat detection surface.

And the X-ray detector 12 is an example of an X-ray detecting unit.

Figure 3:
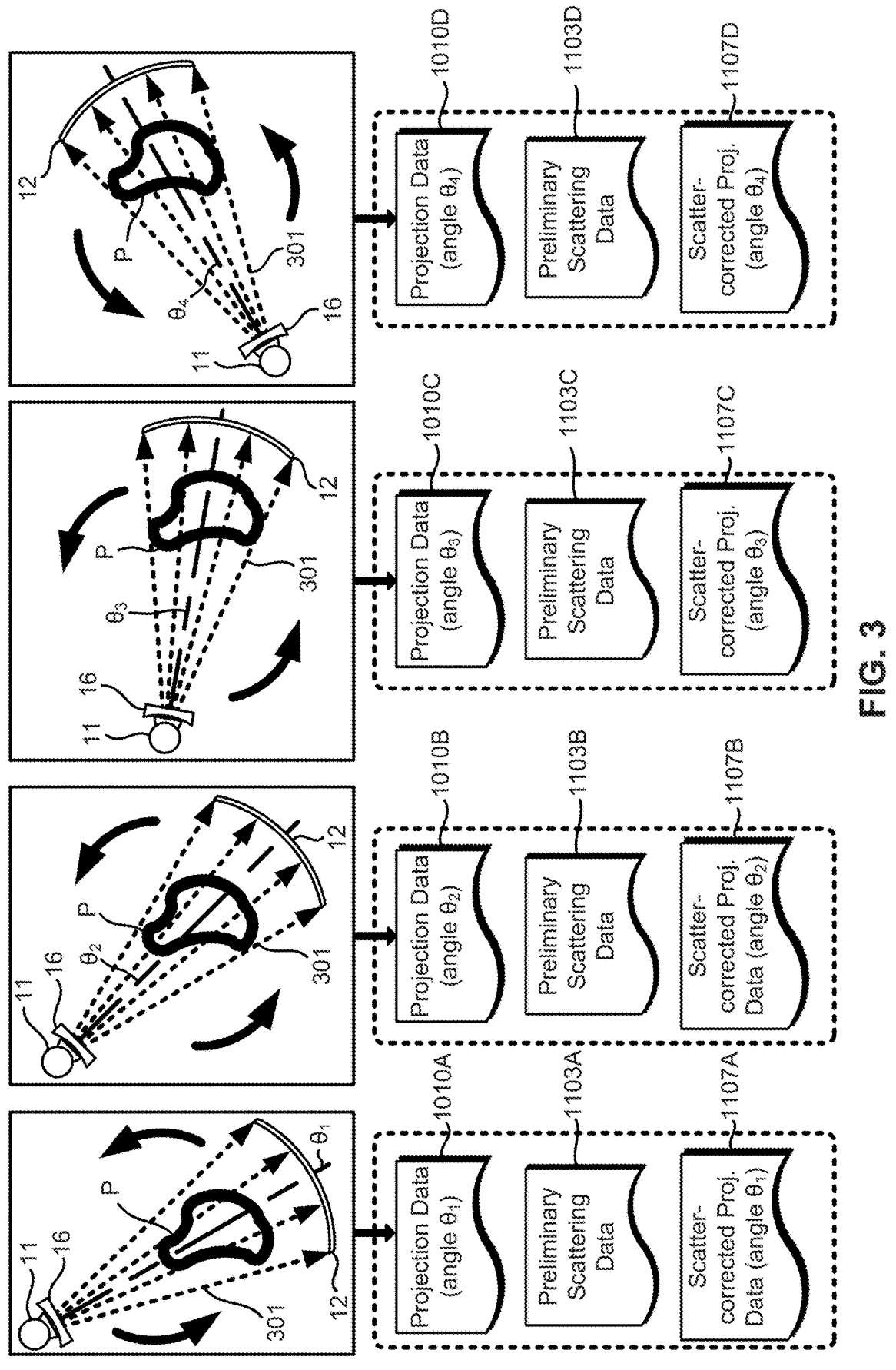
FIG. 3 illustrates example embodiments of subsets of projection data.

Also, a group of detected X-rays that were radiated from the X-ray tube 11 and that have passed through the subject P and that were detected together (e.g., when the X-ray tube and the X-ray detector 12 were at a certain detection angle relative to the subject P) may be referred to as a measured projection (e.g., FIG. 3 illustrates four measured projections, which were acquired at different detection angles), and the corresponding projection data may also be referred to as measured projection data.

The X-ray high-voltage circuit 14 includes a high-voltage generating circuit that includes an electric circuit of a transformer, a rectifier, etc., and that has a function of generating a high voltage to be applied to the X-ray tube 11, and the X-ray high-voltage circuit 14 includes an X-ray controller that controls an output voltage corresponding to the X-rays that are emitted by the X-ray tube 11. The high-voltage generating circuit may employ a transformer system or an inverter system. The X-ray high-voltage circuit 14 may be provided on a rotation frame 13 (described below) or may be provided on the side of a fixed frame (not illustrated in FIG. 1) of the gantry 10. Note that the fixed frame is a frame that supports the rotation frame 13 rotatably. The X-ray high-voltage circuit 14 is an example of an X-ray high-voltage unit.

The data-acquisition system (DAS) 18 includes an amplifier that performs amplification processing on the electric signal that is output from each X-ray detecting element of the X-ray detector 12 and includes an A/D converter that converts the electric signal into a digital signal, and the DAS

18 generates projection data (detection data). The projection data indicate the X-rays that are measured by the X-ray detector 12 (indicate measured projections). The projection data that are generated by the DAS 18 are transferred to the console 40. The DAS 18 is an example of a data collecting unit. Also, a CT scan may produce a respective set of projection data, and the set of projection data may include subsets of projection data that were captured at respective detection angles.

The rotation frame 13 is an annular frame that supports the X-ray tube 11 and the X-ray detector 12 such that the X-ray tube 11 and the X-ray detector 12 are opposed to each other. A controller 15 (described below) causes the rotation frame 13 to rotate the X-ray tube 11 and the X-ray detector 12 (for example, as illustrated in FIG. 3). The rotation frame 13 may further support, in addition to the X-ray tube 11 and the X-ray detector 12, the X-ray high-voltage circuit 14 and the DAS 18.

The rotation frame 13 is supported by a non-rotation part of the gantry 10 (for example, the fixed frame, which is not illustrated in FIG. 1) such that the rotation frame 13 is rotatable. The rotation mechanism includes, for example, a motor that generates a rotary drive force and a bearing that transmits the rotary drive force to the rotation frame 13 and rotates the rotation frame 13. The motor is provided on, for example, the non-rotation part. The bearing is physically connected to the rotation frame 13 and the motor. And the rotation frame 13 rotates in accordance with the rotary drive force of the motor.

Each of the rotation frame 13 and the non-rotation part is provided with a noncontact-type or contact-type communication circuit, by which communication is performed between a component supported by the rotation frame 13 and the non-rotation part or an external device of the gantry 10. When, for example, optical communication is employed as a noncontact communication method, the projection data that are generated by the DAS 18 are transmitted, by optical communication, from a transmitter that is provided on the rotation frame 13 and that has a light-emitting diode (LED) to a receiver that is provided on a non-rotation part of the gantry 10 and that has a photodiode, and the receiver then transmits the projection data from the non-rotation part to the console 40. Some embodiments also use, as the communication method, a noncontact-type data-transmission method, such as a capacitance-coupling method or a radio-wave method, or a contact-type data-transmission method, such as a contact-type data-transmission method that uses a slip ring and an electrode brash.

Also, the rotation frame 13 is an example of a rotation unit.

Furthermore, some embodiments of the X-ray CT apparatus 1 can perform upright CT scans. Accordingly, these embodiments include gantries that are configured to accommodate upright scanning, and some embodiments do not include the table 30. For example, some embodiments include a gantry 10 that is configured to rotate the rotation frame 13 around a standing subject P, and are thus configured to rotate about an axis of rotation that is perpendicular to the axis of rotation of the rotation frame 13 that is shown in FIG. 1 (i.e., are configured to rotate about the Y-axis as it is illustrated in FIG. 1). Also, some embodiments include a patient-supporting mechanism (e.g., a seat) that is different from the table 30 or omit the patient-supporting mechanism. And some embodiments (e.g., embodiments that perform dental CT scanning) omit parts of the gantry 10 or have a gantry 10 that is configured to perform dental CT scanning.

And the X-ray CT apparatus 1 is available in various types, such as a rotate/rotate type (a third-generation CT) in which the X-ray tube 11 and the detector 12 integrally rotate around the subject P and a stationary/rotate type (a fourth-generation CT) in which a large number of X-ray detecting elements in a ring-shaped array are fixed, while only the X-ray tube 11 rotates around the subject P. Any type is applicable to the present embodiments.

The controller 15 includes circuitry, such as processing circuitry (which includes a CPU or the like), and a drive mechanism, such as a motor and an actuator. Furthermore, the controller 15 has a function of receiving an input signal from an input interface circuit 43 (described below) that is attached to the console 40 or to the gantry 10 and a function of controlling operations of the gantry 10 and the table 30. For example, the controller 15 is configured to exercise control, upon receipt of input signals, to cause the rotation frame 13 to rotate, to cause the gantry 10 to tilt, and to cause the table 30 and the table top 33 to operate. In this situation, the control to tilt the gantry 10 is realized as a result of the controller 15 rotating the rotation frame 13 on an axis parallel to the X-axis direction, according to tilting angle (tilt angle) information input through an input interface circuit 43 attached to the gantry 10. Additionally, the controller 15 may be provided for the gantry 10 or for the console 40. The controller 15 is an example of a control unit.

The table 30 is a device on which the subject P is positioned and moved, and the table 30 includes a base 31, a table drive circuit 32, the table top 33, and a support frame 34.

The base 31 is a casing that supports the support frame 34 movably and perpendicularly. The table drive circuit 32 includes a motor or an actuator that causes the table top 33, on which the subject P may be laid in the longitudinal direction of the table top 33, to move. The table top 33 that is provided on a top surface of the support frame 34 is a board on which the subject P is laid. In addition to moving the table top 33, the table drive circuit 32 may move the support frame 34 in the longitudinal direction of the table top 33.

The console 40 includes circuitry and other hardware. The circuitry and other hardware include the following: a memory 41, a display 42, an input interface circuit 43, and processing circuitry 44. Note that although the console 40 and the gantry 10 are explained herein as different devices, the gantry 10 may include the console 40 or at least some of the components of the console 40.

The memory 41 is implemented using, for example, a random access memory (RAM), a semiconductor memory (e.g., a flash memory), a hard disk, an optical disk, or the like. The memory 41 stores, for example, projection data and reconstructed-image data. The memory 41 is an example of storage and an example of a storage unit. Furthermore, storage for storing the projection data and the reconstructed-image data are not limited to the memory 41 of the console 40, and a cloud server that is connectable to the X-ray CT apparatus 1 via a communication network, such as the Internet, may store the projection data and the reconstructed-image data when receiving a store request from the X-ray CT apparatus 1.

The display 42 displays various types of information. For example, the display 42 outputs a medical image (CT image) that is generated by the processing circuitry 44 and outputs a graphical user interface (GUI) for receiving various operations from the operator. Also for example, the display 42 may be a liquid-crystal display or a cathode-ray-tube (CRT) display. The display 42 may be provided on the gantry 10, and the display 42 may be a desktop type or may be a tablet terminal or the like that is capable of performing wireless communication with the body of the console 40. And the display 42 is an example of a display unit.

The input interface circuit 43 receives various input operations from the operator, converts the received input operations into electric signals, and outputs the electric signals to the processing circuitry 44. For example, the input interface circuit 43 receives, from the operator, the following: collection conditions on collecting projection data, reconstruction conditions on reconstructing a CT image, and image-processing conditions on generating a post-processed image from a CT image. Also, for example, the input interface circuit 43 may be implemented using a mouse, a keyboard, a trackball, a switch, a button, a joystick, or a touchscreen. The input interface circuit 43 is an example of an input unit. Additionally, the input interface circuit 43 may be provided on the gantry 10. And the input interface circuit 43 may be configured by a tablet terminal or the like that is capable of performing wireless communication with the body of the console 40.

The processing circuitry 44 controls the operations of the X-ray CT apparatus 1. The processing circuitry 44 includes one or more central processing units (CPUs), such as microprocessors (e.g., a single core microprocessor, a multi-core microprocessor); one or more graphics processing units (GPUs); one or more application-specific integrated circuits (ASICs); one or more field-programmable-gate arrays (FPGAs); one or more digital signal processors (DSPs); or other electronic circuitry (e.g., other integrated circuits). And the processing circuitry 44 is an example of a processing unit.

The processing circuitry 44 performs, for example, a system-control function 441, a pre-processing function 442, a reconstruction-processing function 443, an image-processing function 444, a display-control function 445, a scatter-calculation function 446, a scatter-correction function 447, and a structural-information function 448. Furthermore, the processing circuitry 44 may cooperate with the memory 41 to perform the functions.

The system-control function 441 controls various functions of the processing circuitry 44 based on input operations that are received from the operator via the input interface circuit 43. The system-control function 441 is an example of a control unit.

The pre-processing function 442 generates data obtained by performing pre-processing (e.g., logarithmic transformation and offset correction processing, sensitivity correction processing between channels, and beam hardening correction) on the projection data that are output from the DAS 18. The data before the pre-processing and the data after the pre-processing may both be referred to as projection data (e.g., measured projection data). Also, the projection data before the pre-processing may be referred to as detection data, and the projection data after the pre-processing may be referred to as preprocessed projection data. Furthermore, the pre-processing function 442 may generate data obtained by performing pre-processing on scatter-corrected projection data. The pre-processing function 442 is an example of a pre-processing unit.

The reconstruction-processing function 443 generates reconstructed-image data (CT-image data) by performing reconstruction processing using, for example, a filter correction back projection method, a successive approximation reconstruction method, etc., on the projection data, such as the projection data that are generated by the pre-processing function 442. The reconstruction-processing function 443 is an example of a reconstruction processing unit.

The image-processing function 444 converts the reconstructed-image data generated by the reconstruction-processing function 443 into tomographic-image data on a freely selected cross section or three-dimensional image data by a known method based on an input operation that is received from the operator via the input interface circuit 43. The generation of the three-dimensional image data may be performed directly by the reconstruction-processing function 443. The image-processing function 444 is an example of an image processing unit.

The display-control function 445 controls the display of images that are based on the three-dimensional image data or the tomographic-image data on the display 42. The formatting of the display may be based on input operations that are received from the operator via the input interface circuit 43. And the display-control function 445 is an example of a display-control unit.

The scatter-calculation function 446 generates scatter-distribution data that indicate (e.g., define, estimate, describe) the scatter components in projection data (e.g., detection data, preprocessed projection data) using one or more neural networks and using preliminary scattering data. In the scatter-distribution data, the scatter components (e.g., the scatter flux) may be indicated by a scatter distribution. And the scatter-calculation function 446 is an example of a scatter-calculation unit.

The scatter-correction function 447 corrects projection data (e.g., detection data, preprocessed projection data) using scatter-distribution data. For example, the scatter-correction function 447 may subtract the scatter components, as defined by a scatter distribution in scatter-distribution data, from the projection data. The scatter-corrected projection data may then be used by the pre-processing function 442 or the reconstruction-processing function 443. And the scatter-correction function 447 is an example of a scatter-correction unit.

The structural-information function 448 generates preliminary scattering data based on reconstructed-image data. And the structural-information function 448 is an example of a structural-information unit.

Although the console 40 is explained such that the single console performs the functions, at least some of the functions may be performed by different consoles. For example, the functions of the processing circuitry 44, such as the pre-processing function 442 and the reconstruction-processing function 443, may be provided decentrally.

Additionally, the processing circuitry 44 may be included in a device other than the console 40. For example, the processing circuitry 44 may be included in an integrated server that collectively performs processing on the projection data that are acquired by two or more medical-image diagnosis apparatuses (e.g., X-ray CT apparatuses 1).

Figure 2:
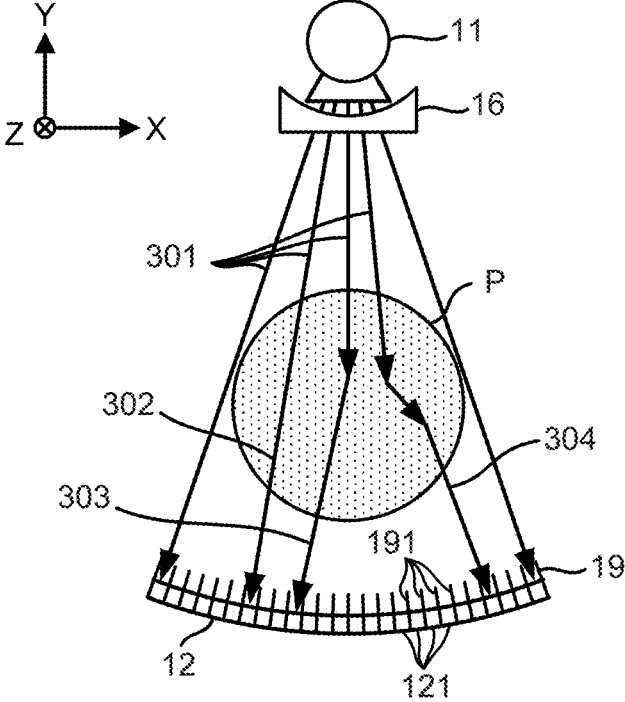
FIG. 2 illustrates an example of scattering.

FIG. 2 illustrates an example of scattering. As X-rays 301 travel through the subject P, some of the X-rays 301 may be scattered. The X-rays 301 include a primary flux 302, which is composed of the X-rays that have not been scattered. In addition to the primary flux 302, the X-rays 301 also include a first-scatter flux 303 (first-scatter rays), which is composed of the X-rays that have undergone a single scattering event (been scattered once). And the X-rays 301 also include a multi-scatter flux 304 (multi-scatter rays), which is composed of the X-rays that have been scattered multiple times. The detector 12 can detect the total flux T(u, v), which includes both the primary flux 302 (P(u, v)) and the scatter flux S(u, v) (which is composed of the first-scatter flux 303 and the multi-scatter flux 304). The scatter flux S(u, v) (scatter rays) may be described or otherwise defined by scatter-distribution data. And the X-rays in the scatter flux S(u, v) (the scatter rays) constitute the scatter components.

Also, in this embodiment, the X-ray tube 11 and the X-ray detector 12 are configured to rotate around the subject P (for example, as illustrated in FIG. 3). Thus, at different detection angles relative to the subject P, the X-ray tube 11 emits X-rays 301 that travel through the scanned region of the subject P and are detected by the X-ray detector 12. And, at each of the detection angles, the detector 12 generates a respective group of projection data, and each group of projection data defines a respective measured projection.

The detection angles collectively define an angular scanning range. For example, in some embodiments, the angular scanning range is 0 to 180°, and in some embodiments the angular scanning range is 0 to 360°. Additionally, during a scanning operation (e.g., a CT scan), some embodiments of the X-ray CT apparatus 1 generate respective groups of projection data at 900 to 1,200 detection angles, and consequently obtain the same number of measured projections (900 to 1,200). Thus, for example, if during a scanning operation the scanning device generates groups of projection data at 900 detection angles that range from 0 to 180° and that are evenly spaced, then the increment between detection angles would be 0.2°. Also for example, if the scanning device generates groups of projection data at 1,200 detection angles that range from 0 to 360° and that are evenly spaced, then the increment between detection angles would be 0.30.

And each group of projection data may constitute a subset in the set of projection data that is generated by the scanning operation. Furthermore, the set of projection data may define a sinogram.

Additionally, this embodiment includes an anti-scatter grid 19 that is positioned on or near a detection-surface side of the X-ray detector 12. And the anti-scatter grid 19 includes a plurality of plates 191. The plates 191 are provided in such a manner that their plate surfaces extend parallel to a radiation direction (which is approximated by the Y-axis in FIG. 2) of the X-rays that are emitted by the X-ray tube 11. Furthermore, the plates 191 may be located on the boundaries of the detecting elements 121 (e.g., pixels) of the X-ray detector 12. Because the plates 191 extend in, or approximately in, the radiation direction, the scatter rays that traverse (have a directional component that is perpendicular to) the radiation direction can be blocked by the anti-scatter grid 19. However, scatter rays that advance along the radiation direction (have no directional component that is perpendicular to the radiation direction or have a small directional component that is perpendicular to the radiation direction) cannot be blocked by the anti-scatter grid 19. Thus, the scatter flux S(u, v) may include scatter rays that advance along the radiation direction and may not include scatter rays that traverse the radiation direction.

In CT imaging, scatter rays that are detected by the X-ray detector 12 can reduce image quality. The X-ray CT apparatus 1 can calculate the scatter distribution (e.g., the scatter flux) from projection data, use the scatter distribution to remove at least some of the scatter components (the scatter rays) from the projection data, and then reconstruct CT-image data from the scatter-corrected projection data.

FIG. 3 illustrates example embodiments of subsets of projection data. The X-ray tube 11 and the X-ray detector 12 rotate around the subject P (note that some components, including the collimator 17 and the anti-scatter grid 19, are omitted to simplify the illustration). And, at different detection angles relative to the subject P, the X-ray tube 11 emits X-rays 301 that travel through the scanned region of the subject P and are measured by the X-ray detector 12. At each of the detection angles (which may also be referred to as "views"), the detector 12 outputs electric signals that correspond to the amount of measured X-rays to the DAS 18, and the DAS 18 generates a respective one of the subsets of projection data 1010A-D for the detection angle (view). Accordingly, for the electric signals that were output by the detector 12 based on X-rays 301 that were measured at detection angle θ₁, the DAS 18 generates a respective subset of projection data 1010A. For the electric signals that were output by the detector 12 based on X-rays 301 that were measured at detection angle θ₂, the DAS 18 generates a respective subset of projection data 1010B. And, for the electric signals that were output by the detector 12 based on X-rays 301 that were measured at detection angle θ₃, the DAS 18 generates a respective subset of projection data 1010C. Finally, for the electric signals that were output by the detector 12 based on X-rays 301 that were measured at detection angle θ₄, the DAS 18 generates a respective subset of projection data 1010D. Each of the subsets of projection data 1010A-D indicates a respective measured projection.

As described below, for each of the subsets of projection data 1010A-D, some embodiments of the console 40 (or other specially-configured computing device) generate respective preliminary scattering data and respective scatter-corrected projection data. Consequently, some embodiments of the console 40 (or other specially-configured computing device) generate respective (corresponding) preliminary scattering data 1103A and respective (corresponding) scatter-corrected projection data 1107A for the subset of projection data 1010A that is based on X-rays 301 that were measured at detection angle θ₁, generate respective (corresponding) preliminary scattering data 1103B and respective (corresponding) scatter-corrected projection data 1107B for the subset of projection data 1010B that is based on X-rays 301 that were measured at detection angle θ₂, generate respective (corresponding) preliminary scattering data 1103C and respective (corresponding) scatter-corrected projection data 1107C for the subset of projection data 1010C that is based on X-rays 301 that were measured at detection angle θ₃, and generate respective (corresponding) preliminary scattering data 1103D and respective (corresponding) scatter-corrected projection data 1107D for the subset of projection data 1010D that is based on X-rays 301 that were measured at detection angle θ₄.

Figure 4:
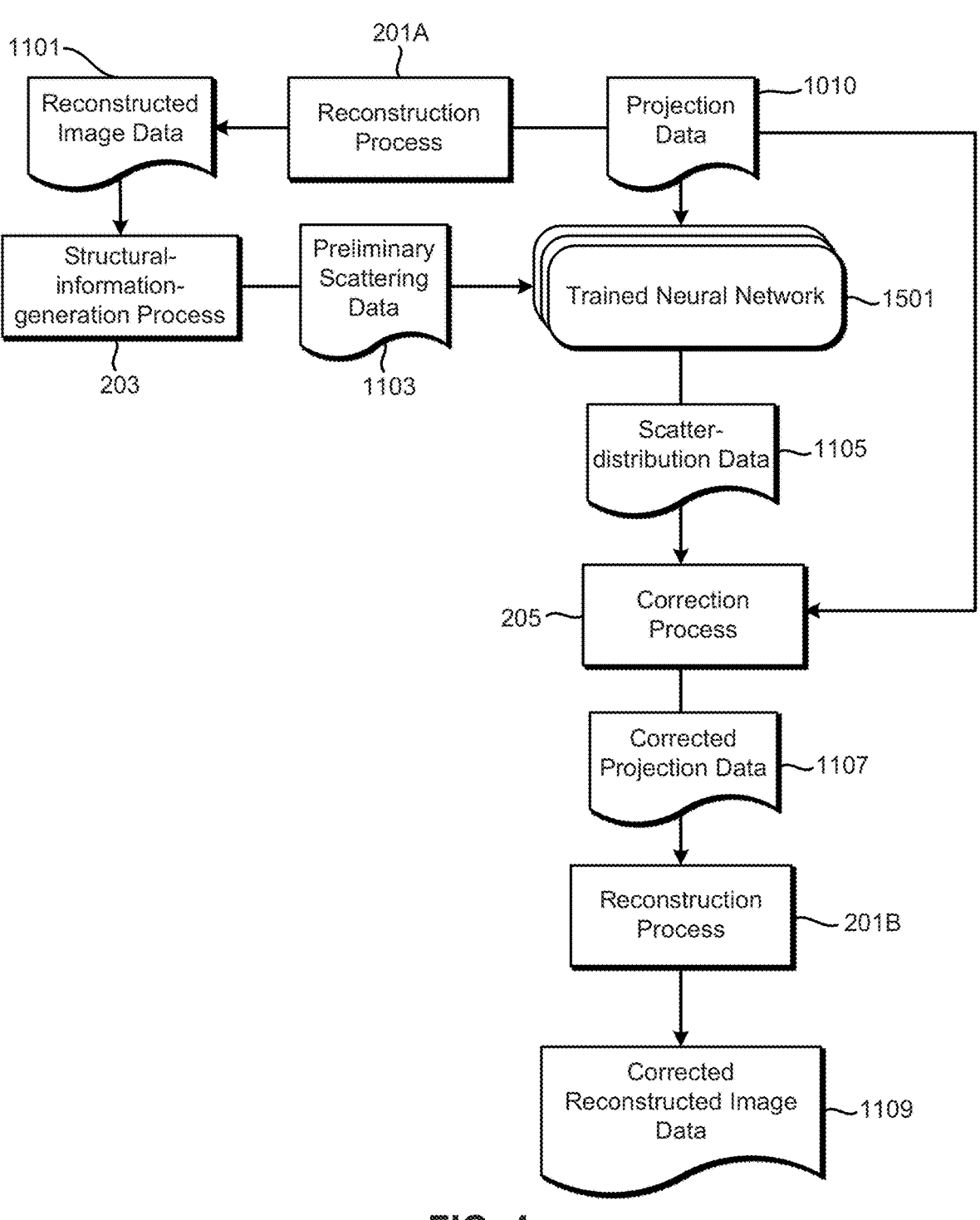
FIG. 4 illustrates the flow of information in an example embodiment of an image-reconstruction process.

FIG. 4 illustrates the flow of information in an example embodiment of an image-reconstruction process. The image-reconstruction process may be performed by the X-ray CT apparatus 1 (e.g., by the console 40) or a medical-image processing apparatus that is external to the X-ray CT apparatus 1 (e.g., a workstation). A set of projection data 1010 (e.g., sinogram data) is obtained (e.g., by performing a CT scan, by retrieving the projection data 1010 from internal storage, by retrieving the projection data 1010 from another device) and is input into an initial reconstruction process 201A, which generates non-scatter-corrected reconstructed-image data 1101 (initial reconstructed-image data 1101) based on the projection data 1010. For example, a system-control function 441 of a console 40 may obtain the set of projection data 1010, and a reconstruction-processing function 443 of the console 40 may perform the initial reconstruction process 201A.

Examples of reconstruction processes (e.g., the initial reconstruction process 201A) include filtered back projection (e.g., Radon transform) and iterative reconstruction.

The non-scatter-corrected reconstructed-image data 1101 define one or more reconstructed images (CT images) of the scanned region, and the projection data 1010 may include subsets of projection data 1010 that were acquired at different detection angles (views).

The non-scatter-corrected reconstructed-image data 1101 are input into a structural-information-generation process 203, which outputs preliminary scattering data 1103 that are generated based on the non-scatter-corrected reconstructed-image data 1101. For example, the structural-information function 448 may perform the structural-information-generation process 203.

The preliminary scattering data 1103 include information about the structural composition of the scanned region, and the preliminary scattering data 1103 indicate how strongly the structures (e.g., materials, organs, bone, fluids) in the scanned region scatter X-rays. Also, the structural-information function 448 may generate respective preliminary scattering data 1103, and the respective preliminary scattering data 1103 may be defined in the projection space. For example, for each of the four detection angles θ1-θ₄ in FIG. 3, the structural-information function 448 may generate the respective preliminary scattering data 1103A-D. And, as explained below, the respective preliminary scattering data 1103 for a detection angle may be used to detect or remove the scatter components in the group of projection data (the subset of projection data) that were acquired at the detection angle.

Examples of the preliminary scattering data 1103 include first-scatter distributions and structure-mask projections (e.g., bone-mask projections).

Radiative transfer equations (RTEs) and Monte Carlo techniques can be used to describe (e.g., calculate, model) a scatter distribution, which includes a first-scatter distribution. For example, the first-scatter distribution may define a first-scatter flux.

A radiative transfer equation (RTE) can describe the total scatter distribution:

$$\hat{\Omega} \cdot \nabla \psi(\vec{r}, E, \hat{\Omega}) + \mu(\vec{r}, E, \hat{\Omega}) = \iint d\hat{\Omega}' dE' f(\vec{r}, E, E, \hat{\Omega} \cdot \hat{\Omega}') \psi(\vec{r}, E', \hat{\Omega}'), \quad (1)$$

where the boundary condition can be described by $$\omega(\vec{r}_c, E, \hat{\Omega}) = \psi_c(\vec{r}_c, E, \hat{\Omega}), \text{ for } \hat{n} \cdot \hat{\Omega} < 0, \quad (2)$$

where $\psi(\vec{r}, E, \hat{\Omega})$ is the specific intensity of photon flux at point $\vec{r}$, where E is energy, where $\hat{\Omega}$ is direction, where $\psi_c(\vec{r}_c, E, \hat{\Omega})$ depends on the X-ray source and bowtie scattering, where $\vec{r}_c$ indicates a point on the surface of the object, where n̂ is the normal direction of the boundary surface, where $f(\vec{r}', E, E', \hat{\Omega} \cdot \hat{\Omega}')$ is the scatter cross section (for X-ray CT, Compton, and Rayleigh scattering), and where $\mu(\vec{r}'', E)$ is the total attenuation coefficient.

In accordance with the RTE, the first-scatter distribution $\Phi_{1s}(\vec{r}_D, E)$ can be $$\Phi_{1s}(\vec{r}_D, E) = \iint d\hat{\Omega} R_{ASG}(E, \hat{\Omega}) \int_{\vec{r}_c}^{\vec{r}_D} d\vec{r}' \cdot d\hat{\Omega}' dE' f(\vec{r}', E, E', \hat{\Omega} \cdot \hat{\Omega}') \psi_c(\vec{r}_c, E', \hat{\Omega}') \quad (3)$$

$$\exp\left[-\int_{\vec{r}_c}^{\vec{r}_D} d\vec{r}'' \mu(\vec{r}'', E)\right],$$

where $\vec{r}_D$ is the location of the detecting elements, and where $R_{ASG}(E, \hat{\Omega})$ is the effective factor of a grid (an anti-scatter grid).

Also, the first-scatter distribution may be generated using other techniques or methods, for example Monte Carlo methods.

And, as noted above, the first-scatter distribution is calculated using information about the CT system. For example, the information about the CT system may include information about one or more of the following: the CT gantry geometry (e.g., the positions of the X-ray tube 11 and the X-ray detector 12), the wedge's shape and material properties, the filter's shape and material properties, and geometrical and property parameters of the anti-scatter grid 19.

Additionally, as noted above, a respective first-scatter distribution may be generated for each detection angle and may operate in the projection space.

Accordingly, the first-scatter distribution of a detection angle may be used to calculate the scatter components in the subset of projection data that was acquired at the detection angle.

The preliminary scattering data 1103 may also include structure-mask projections, for example bone-mask projections. Because of their different physical properties (e.g., shapes, materials), different structures (e.g., organs, bones) have different scatter strengths. When only projection data are used as inputs for the end-to-end training of the trained neural networks 1501, the trained neural networks 1501 may generate different errors according to the intensity of the scatter distribution. For example, from a total scatter distribution, bone regions generate stronger scatter distributions as compared to soft tissues. Consequently, the trained neural networks 1501 may get larger inference errors around the bone regions. Structure-mask projections provide information to improve the performance of the trained neural networks 1501 in specific structural regions.

To generate structure-mask projections in some embodiments, segmentation is performed on the one or more reconstructed images that are defined by the non-scatter-corrected reconstructed-image data 1101 to segment the one or more reconstructed images into specific structural regions, for example regions of bone. The segmented image (or images) may constitute a structure mask. Various techniques and technologies can be used to perform the segmentation, such as simple Hounsfield Units (HU) thresholds (e.g., pixels or voxels that have respective values above a predefined threshold in Hounsfield Units are determined to be bone) and advanced segmentation techniques.

Forward projections are performed on the structure mask (the segmented image (or images)) to generate the structure-mask projections. A forward projection transforms a structure mask from the image space to the projection space (the space of the projection data). Additionally, as noted above, a respective structure-mask projection may be generated for each detection angle and may operate in the projection space. Thus, multiple forward projections may be performed on the structure mask, and each of the forward projections corresponds to a respective detection angle (e.g., a detection angle of a subset of the projection data 1010) and outputs a respective structure-mask projection for the respective detection angle. Accordingly, the structure-mask projection of a detection angle may be used to calculate the scatter components in the subset of the projection data 1010 that was acquired at the detection angle.

Then the one or more trained neural networks 1501 are applied using the preliminary scattering data 1103 and the projection data 1010 as inputs, and the one or more trained neural networks 1501 output scatter-distribution data 1105, which define respective scatter distributions (the scatter components) for some or all of the projection data 1010. Thus, the scatter-distribution data 1105 may collectively define a total scatter distribution for all the projection data 1010. For example, if the set of projection data 1010 includes subsets of projection data 1010 (e.g., subsets that were acquired at different detection angles), then the scatter-distribution data 1105 may define respective scatter distributions for each of the subsets, and the combination of all of the scatter-distribution data 1105 may define the total scatter distribution for the set of projection data 1010. Also, the one or more trained neural networks 1501 may operate in the projection space (accept, as inputs, data in the projection space and output data in the projection space).

Additionally, only some (but not all) of the projection data 1010 and their respective preliminary scattering data 1103 may be input into the one or more trained neural networks 1501.

Also, when some or all of the projection data 1010 and their respective preliminary scattering data 1103 are input, the one or more trained neural networks 1501 may output scatter-distribution data 1105 for some, but not all, of the projection data 1010. For example, the one or more trained neural networks 1501 may output respective scatter-distribution data 1105 for some subsets of projection data 1010 (each of which may have been acquired at a respective detection angle) but not for other subsets of the projection data 1010. The scatter-distribution data 1010 for the subsets for which the one or more trained neural networks 1501 did not output respective scatter-distribution data 1105 may be interpolated using the scatter-distribution data 1105 that were output by the one or more trained neural networks 1501.

Additionally, subsets of projection data 1010 may be input one-by-one to the one or more trained neural networks 1501, which generate respective scatter distributions for the subsets. Accordingly, the one or more trained neural networks 1501 may be applied at least one time per subset of projection data 1010.

Furthermore, multiple subsets (that constitute less than the entire set of projection data) may be input together into the one or more trained neural networks 1501, which output scatter-distribution data 1105 that correspond to the group of subsets. The scatter-distribution data may be interpolated for some of the subsets of projection data 1010 in the multiple subsets.

Also, a scatter-calculation function 446 may apply the one or more trained neural networks 1501 to generate the scatter-distribution data 1105.

In embodiments that include only one trained neural network 1501, the one trained neural network 1501 may output all of the scatter-distribution data 1105 (e.g., the one trained neural network 1501 may be applied multiple times to output, in the aggregate, all of the scatter-distribution data 1105). In embodiments that include multiple trained neural networks 1501, each of the trained neural networks 1501 may output a respective subset of the scatter-distribution data 1105, and the subsets may not overlap (i.e., each datum of the scatter-distribution data 1105 is output by one, and only one, of the trained neural networks 1501).

Also, for example, the one or more trained neural networks 1501 may include one or more of the following: multilayer perceptron neural networks, convolutional neural networks, deep stacking neural networks, recurrent neural networks, and modular neural networks.

The scatter-distribution data 1105 and the projection data 1010 are then input into a correction process 205, which corrects the projection data 1010 based on the scatter-distribution data 1105, thereby producing scatter-corrected projection data 1107, in which the scatter has been reduced or eliminated. The correction process 205 may subtract the scatter components, as indicated by the scatter-distribution data 1105, from the projection data 1010 (e.g., subtract the scatter flux $S(u, v)$ from the total flux $T(u, v)$). For example, the correction process 205 may generate a respective subset of scatter-corrected projection data 1107 for each subset of projection data 1010 based on the subset of projection data 1010 and on its respective scatter-distribution data 1105. And a scatter-correction function 447 may perform the correction process 205.

The scatter-corrected projection data 1107 are then input to a subsequent reconstruction process 201B, which may be the same as the initial reconstruction process 201A or different from the initial reconstruction process 201A. The subsequent reconstruction process 201B generates corrected reconstructed-image data 1109 (subsequent reconstructed-image data) based on the scatter-corrected projection data 1107. The corrected reconstructed-image data 1109 define one or more CT images of the scanned region. And the subsequent reconstruction process 201B may be performed by a reconstruction-processing function 443.

FIG. 5 illustrates an example embodiment of an image-reconstruction process. Although this operational flow and the other operational flows that are described herein are each presented in a certain order, some embodiments may perform at least some of the operations in different orders than the presented orders. Examples of different orders include concurrent, parallel, overlapping, reordered, simultaneous, incremental, and interleaved orders. And some embodiments of the operational flows may include blocks from two or more of the operational flows that are described herein. Thus, other embodiments of the operational flows that are described herein may omit blocks, add blocks, change the order of the blocks, combine blocks, or divide blocks into more blocks.

Furthermore, although this operational flow and the operational flows that are described in FIGS. 6-7 are performed by a console 40, some embodiments of these operational flows are performed by two or more consoles or by one or more other specially-configured computing devices (e.g., medical-image-processing devices).

The flow starts in block B500 and moves to block B510, where a console obtains projection data (e.g., a set of projection data). The projection data may be obtained from one or more DASs or from devices (e.g., external storage devices, such as network-connected storage devices) that store the projection data. And a system-control function 441 of the console may obtain the projection data.

Next, in block B520, the console generates non-scatter-corrected reconstructed-image data (e.g., non-scatter-corrected CT-image data) based on the projection data. And a reconstruction-processing function 443 of the console may generate the non-scatter-corrected reconstructed-image data based on the projection data. The non-scatter-corrected reconstructed-image data define at least one non-scatter-corrected reconstructed image (e.g., a non-scatter-corrected CT image). Also, block B520 may include preprocessing operations, which may be performed by a pre-processing function 442 of the console.

The flow then moves to block B530, where the console generates preliminary scattering data (e.g., first-scatter distributions, structure-mask projections) based on the non-scatter-corrected reconstructed-image data. For example, in some embodiments, the console estimates the preliminary scattering data. And a structural-information function 448 of the console may generate the preliminary scattering data based on the non-scatter-corrected reconstructed-image data.

Then, in block B540, the console applies one or more trained neural networks (or other trained machine-learning models) to generate scatter-distribution data, which indicate the X-ray scatter components. The one or more trained neural networks use the projection data and the preliminary scattering data as inputs. And a scatter-calculation function 446 of the console may apply the one or more trained neural networks to generate the scatter-distribution data. For example, the console may apply a trained neural network multiple times, each time using a respective subset of the projection data and respective preliminary scattering data as inputs, and each time the trained neural network outputs respective scatter-distribution data.

The flow then proceeds to block B550, where the console generates scatter-corrected projection data based on the projection data and on the scatter-distribution data. For example, to generate the scatter-corrected projection data, the console can subtract the scatter flux $S(u, v)$ (which is defined by the scatter-distribution data) from the total flux $T(u, v)$ (which is described by the projection data) to obtain the primary $P(u, v)$ flux (which is described by the scatter-corrected projection data). In other words, the console can subtract the scatter components from the projection data. And a scatter-correction function 447 of the console may generate the scatter-corrected projection data based on the projection data and on the scatter-distribution data.

The flow then advances to block B560, where the console generates scatter-corrected reconstructed-image data, which define one or more scatter-corrected reconstructed images (e.g., one or more scatter-corrected CT images), based on the scatter-corrected projection data. Also, the console may display the one or more scatter-corrected reconstructed images on a display. And a reconstruction-processing function 443 of the console may generate the scatter-corrected reconstructed-image data based on the scatter-corrected projection data, and a display-control function 445 may display the one or more scatter-corrected reconstructed images on a display.

Additionally, block B560 may include performing pre-processing operations on the scatter-corrected projection data, which may be performed by a pre-processing function 442 of the console.

Finally, the flow ends in block B570.

FIG. 6 illustrates an example embodiment of an image-reconstruction process. The flow starts in block B600 and moves to block B605, where a console obtains projection data (e.g., a set of projection data). The projection data may be obtained from one or more DASs or from devices (e.g., external storage devices, such as network-connected storage devices) that store the projection data. And a system-control function 441 of the console may realize block B605.

The flow then moves to block B610, where the console obtains one or more selections of types of preliminary scattering data. For example, the console may obtain a selection of a type that is entered by an operator via an input interface circuit 43. Also, the console may obtain a selection of a type that is sent from another device over a network. And a system-control function 441 of the console may realize block B610.

Next, in block B615, the console obtains respective selections of one or more trained neural networks (or other trained machine-learning models). For example, the console may obtain a selection of a trained neural network that is entered by an operator via an input interface circuit 43. Also, the console may obtain a selection of a trained neural network that is sent from another device over a network. And a system-control function 441 of the console may realize block B615.

Also, in embodiments where certain types of preliminary scattering data correspond to certain neural networks (the neural network accepts the type of preliminary scattering data as an input), the corresponding neural network (or neural networks) of a selected type of preliminary scattering data may be automatically selected in block B610 and block B615 may be omitted. Or block B610 may be omitted, and the corresponding type (or types) of preliminary scattering data of a selected neural network may be selected in block B615.

Then, in block B620, the console generates non-scatter-corrected reconstructed-image data (e.g., non-scatter-corrected CT-image data) based on the projection data. The non-scatter-corrected reconstructed-image data define at least one non-scatter-corrected reconstructed image (e.g., a non-scatter-corrected CT image). And a reconstruction-processing function 443 of the console may realize block B620. Also, block B620 may include preprocessing operations, which may be performed by a pre-processing function 442 of the console.

The flow then moves to block B625, where the console generates (e.g., estimates) preliminary scattering data (e.g., first-scatter distributions, structure-mask projections), according to the selected types, based on the non-scatter-corrected reconstructed-image data. And a structural-information function 448 of the console may realize block B625.

Then, in block B630, the console applies the selected one or more trained neural networks (or other trained machine-learning models) to generate scatter-distribution data, which indicate the X-ray scatter components. Also, the selected one or more trained neural networks use the projection data and the preliminary scattering data as inputs. And a scatter-calculation function 446 of the console may realize block B630.

The flow then proceeds to block B635, where the console generates scatter-corrected projection data based on the projection data and on the scatter-distribution data. In block B635, the console subtracts some or all of the scatter components from the projection data. And a scatter-correction function 447 of the console may realize block B635.

The flow then advances to block B640, where the console generates scatter-corrected reconstructed-image data, which define one or more scatter-corrected reconstructed images (e.g., one or more scatter-corrected CT images), based on the scatter-corrected projection data. And a reconstruction-processing function 443 of the console may realize block B640. Also, block B640 may include performing preprocessing operations on the scatter-corrected projection data, which may be performed by a pre-processing function 442 of the console.

Next, in block B645, the console outputs the scatter-corrected reconstructed-image data to a display, which displays at least some of the one or more scatter-corrected reconstructed images that are defined by the scatter-corrected reconstructed-image data. And a display-control function 445 of the console may realize block B645.

Finally, the flow ends in block B650.

FIG. 7 illustrates an example embodiment of an image-reconstruction process.

Note that, in FIG. 7, "next" does not necessarily mean adjacent in a sequence of detection angles, and "first" does not necessarily mean the first in a sequence of detection angles. Rather, "first" and "next" are used to distinguish subsets from each other in the operations in FIG. 7. For example, in FIG. 7 a "next" subset of the detection data does not necessarily have a corresponding detection angle that is closest to the corresponding detection angle of the previous subset.

The flow starts in block B700 and moves to block B705, where a console obtains a set of projection data that includes subsets of projection data that were acquired at respective detection angles. The projection data may be obtained from one or more DASs or from devices (e.g., external storage devices, such as network-connected storage devices) that store the projection data. And a system-control function 441 of the console may realize block B705.

The flow then moves to block B710, where the console obtains a trained neural network (or other trained machine-learning model). Furthermore, a system-control function 441 of the console may realize block B710.

Then, in block B715, the console generates non-scatter-corrected reconstructed-image data (e.g., non-scatter-corrected CT-image data) based on the set of projection data. The non-scatter-corrected reconstructed-image data define at least one non-scatter-corrected reconstructed image (e.g., a non-scatter-corrected CT image). And a reconstruction-processing function 443 of the console may realize block B715. Also, block B715 may include performing preprocessing operations on the set of projection data, which may be performed by a pre-processing function 442 of the console.

The flow then moves to block B720, where the console generates (e.g., estimates), based on the non-scatter-corrected reconstructed-image data, respective preliminary scattering data (e.g., first-scatter distributions, structure-mask projections) for a first subset of the projection data (detection data that were acquired at a respective detection angle). And a structural-information function 448 of the console may realize block B720.

Next, in block B725, the console determines whether to generate respective preliminary scattering data for another subset of the projection data. For example, the console may determine to generate respective preliminary scattering data for another subset of the projection data if there is a subset of the projection data for which the respective preliminary scattering data has not been generated or if respective preliminary scattering data has not been generated for a predetermined percentage or predetermined number of the subsets. If the console determines to generate respective preliminary scattering data for another subset of the projection data (B725=Yes), then the flow proceeds to block B730. If the console determines not to generate respective preliminary scattering data for another subset of the projection data (B725=No), then the flow moves to block B735. And a structural-information function 448 of the console may realize block B725.

In block B730, the console generates (e.g., estimates), based on the non-scatter-corrected reconstructed-image data, respective preliminary scattering data (e.g., first-scatter distributions, structure-mask projections) for a next subset of the projection data. The next subset of the projection data may be the next in a series of the subsets, or the next subset may be separated, in the series, from the previous subset by one or more other subsets (thus, some of the subsets are skipped in such embodiments). And a structural-information function 448 of the console may realize block B730.

The flow then returns to block B725. Accordingly, in the iterations of blocks B720-B730, the console generates respective preliminary scattering data for some or all of the subsets of the projection data.

In block B735, the console applies the trained neural network to generate scatter-distribution data for the first subset of the projection data, using the first subset of the projection data and the respective preliminary scattering data of the first subset as inputs. And a scatter-calculation function 446 of the console may realize block B735.

Next, in block B740, the console determines whether to generate respective scatter-distribution data for another subset of the projection data. For example, the console may determine to generate respective scatter-distribution data for another subset of the projection data if there is a subset of the projection data for which the respective scatter-distribution data has not been generated or if there is a subset of the projection data for which respective preliminary scattering data were generated and for which the respective scatter-distribution data has not been generated. If the console determines to generate respective scatter-distribution data for another subset of the projection data (B740=Yes), then the flow proceeds to block B745. If the console determines not to generate respective scatter-distribution data for another subset of the projection data (B740=No), then the flow moves to block B750. And a scatter-calculation function 446 of the console may realize block B740.

In block B745, the console applies the trained neural network to generate scatter-distribution data for the next subset of the projection data (the next subset for which scatter-correction data were generated), using the next subset of the projection data and the respective preliminary scattering data of the next subset as inputs. And a scatter-calculation function 446 of the console may realize block B745.

Furthermore, in some embodiments two or more trained neural networks (or other trained machine-learning models) are obtained in block B710 and, in blocks B735 and B745, at least one of the trained neural networks is used. However, different trained neural networks may be used in block B735 and B745 (and in the various iterations of block B745). Thus, some embodiments do not use a single trained neural network to generate all of the scatter-distribution data.

Also, in block B745, some embodiments of the console interpolate the respective scatter-distribution data for the next subset of the projection data based on the respective scatter-distribution data for one or more other subsets of the projection data (e.g., the subsets that were acquired at the closest detection angles). In some environments, interpolation may be performed faster, or may be less computationally expensive, than applying a neural network. Consequently, interpolation may speed up the operations or may require fewer computational resources. Thus, in some embodiments, not every iteration of block B745 uses a neural network.

The flow then returns to block B740.

Accordingly, in the iterations of blocks B735-B745, the console generates respective scatter-distribution data for some or all of the subsets of the projection data (e.g., at least all of the subsets for which respective scatter-correction data were generated).

The flow then proceeds to block B750, where the console generates respective scatter-corrected projection data for the first subset of the projection data based on the first subset of the projection data and on the respective scatter-distribution data of the first subset. And a scatter-correction function 447 of the console may realize block B750.

Next, in block B755, the console determines whether to generate respective scatter-corrected projection data for another subset of the projection data. For example, the console may determine to generate respective scatter-cor-rected projection data for another subset of the projection data if there is a subset of the projection data for which respective scatter-distribution data were generated and for which the respective scatter-corrected projection data have not been generated. If the console determines to generate respective scatter-corrected projection data for another subset of the projection data (B755=Yes), then the flow proceeds to block B760. If the console determines not to generate respective scatter-corrected projection data for another subset of the projection data (B755=No), then the flow moves to block B765. And a scatter-correction function 447 of the console may realize block B755.

In block B760, the console generates respective scatter-corrected projection data for the next subset of the projection data based on the next subset of the projection data and on the respective scatter-distribution data of the next subset. And a scatter-correction function 447 of the console may realize block B760. The flow then returns to block B755. Accordingly, in the iterations of blocks B750-B760, the console generates respective scatter-corrected projection data for some or all of the subsets of the projection data. Also, blocks B750 and B760 may be performed, at least in part, in projection space.

In block B765, the console generates scatter-corrected reconstructed-image data, which define one or more scatter-corrected reconstructed images (one or more scatter-corrected CT images), based on the scatter-corrected projection data. For example, a reconstruction-processing function 443 of the console may realize block B765. Also, block B765 may include performing preprocessing operations on the scatter-corrected projection data, which may be performed by a pre-processing function 442 of the console.

Next, in block B770, the console outputs the scatter-corrected reconstructed-image data to a display, which displays at least some of the one or more scatter-corrected reconstructed images that are defined by the scatter-corrected reconstructed-image data. For example, a display-control function 445 of the console may realize block B770.

Finally, the flow ends in block B775.

Figure 8:
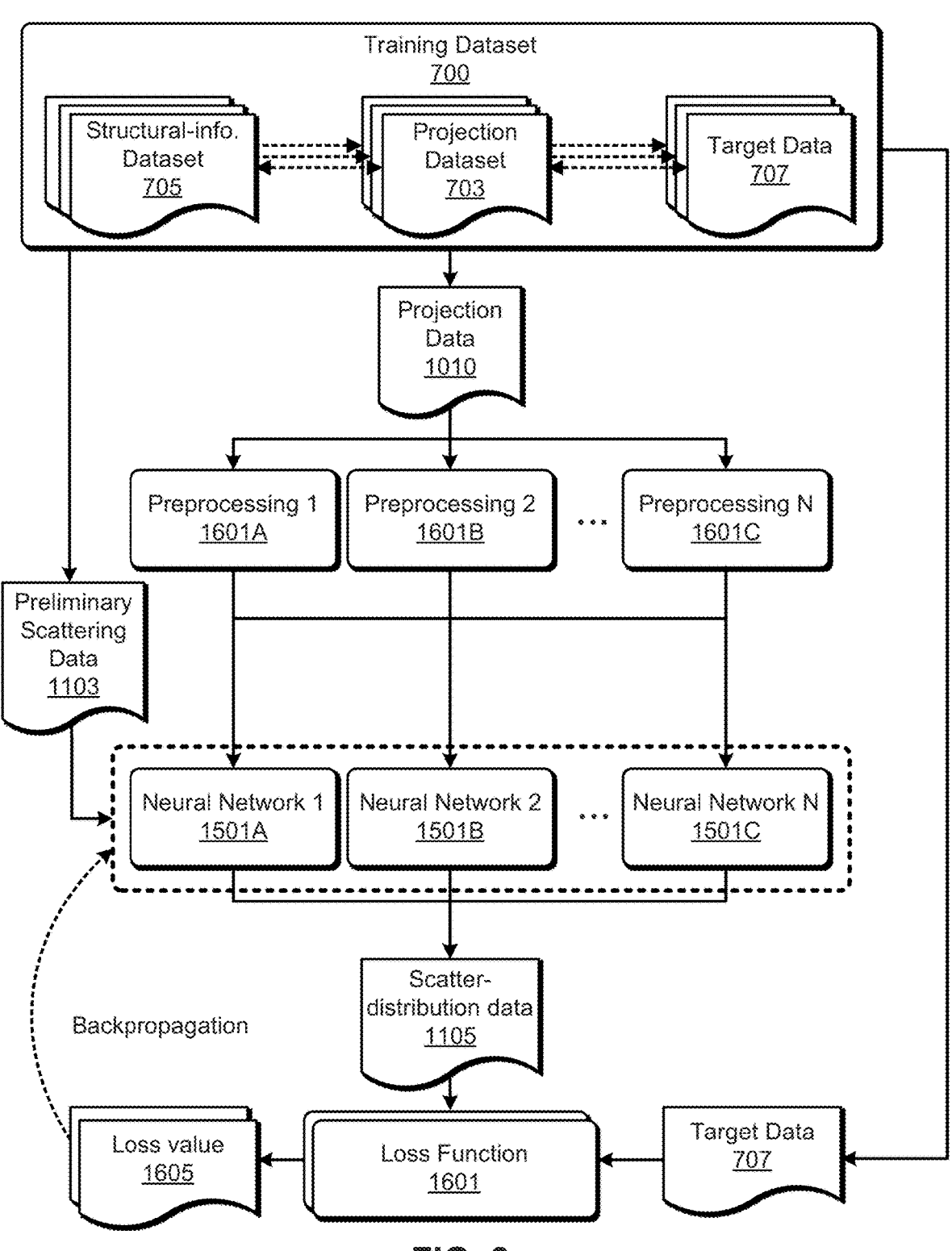
FIG. 8 illustrates the flow of information in an example embodiment of a training process.

FIG. 8 illustrates the flow of information in an example embodiment of a training process. In FIG. 8, a training dataset 700 includes a plurality of projection datasets 703, corresponding structural-information datasets 705, and corresponding target data 707.

The projection data 1010 from a scanning operation (e.g., a CT scan) may be stored together in a projection dataset 703, and the corresponding preliminary scattering data 1103 may be stored in a corresponding structural-information dataset 705. A large training dataset 700, which includes a plurality of projection datasets 703 and corresponding structural-information datasets 705, can be used to account for the several factors upon which X-ray scatter can depend, for example the following: scanning-device geometry (e.g., CT scanning-device geometry), the source energy spectrum, and the size and organ distribution of patients. Thus, in some embodiments, the training dataset 700 can include a plurality of phantom projection datasets 703 (and corresponding structural-information datasets 705) and a plurality of patient projection datasets 703 (and corresponding structural-information datasets 705). Each phantom of the plurality of phantom projection datasets 703 can be selected according to a predetermined human anatomy through modulation of the shape, size, and material each phantom is constructed from. In addition, and in consideration of a representative population of patients, the plurality of patient projection datasets 703 can be selected to include patients of simple and complex anatomies, the data including typical patient data with variations including, among others, patient shape, patient anatomy, organ distribution, size, metal inclusion, and contrast. Also, the patient projection datasets 703 can be selected to include variations in the scanning kVp and dosage.

Also, each projection dataset 703 has corresponding target data 707. The corresponding target data 707 may include scatter-distribution data that define the scatter components (scatter flux) in the projection data from the corresponding projection dataset 703. Thus, the corresponding target data 707 may define some or all of the scatter flux of the corresponding projection data 703. In some embodiments, the target data 707 are generated using Monte Carlo techniques or RTEs.

The corresponding target data 707 of a projection dataset 703 may include scatter-distribution data that define a scatter distribution (e.g., a total scatter distribution) on one or more radiation detectors. For example, in some embodiments, the specific intensity of photon flux at point $\vec{r}$ in a total scatter distribution may be described, in the format of a radiative transfer equation, by the following:

$$\psi(\vec{r}, E, \hat{\Omega}) = \int_{\vec{r}_c}^{\vec{r}} dr'$$

$$\int\int d\hat{\Omega}' dE' f\left(\vec{r}, E, E', \hat{\Omega} \cdot \hat{\Omega}'\right)\psi(\vec{r}_c, E', \hat{\Omega}')\exp\left[-\int_{\vec{r}'}^{\vec{r}} d\vec{r}'' \mu(\vec{r}'', E)\right] +$$

$$\psi_c(\vec{r}_c, E, \hat{\Omega}\cdot)\exp\left[-\int_{\vec{r}_c}^{\vec{r}} d\vec{r}'' \mu(\vec{r}'', E)\right], \quad (4)$$

where $\psi(\vec{r}, E, \hat{\Omega})$ is the specific intensity of photon flux at point $\vec{r}$, energy E, and direction $\hat{\Omega}$; where $\psi_c(\vec{r}_c, E, \hat{\Omega})$ depends on the X-ray source and bowtie scattering; where $\vec{r}_c$ indicates a point on the surface of the object; where n is the normal direction of the boundary surface; where $f(\vec{r}', E, E', \hat{\Omega}\cdot\hat{\Omega}')$ is the scatter cross section, for x-ray CT, Compton, and Rayleigh scattering; and where $\mu(\vec{r}'', E)$ is the total attenuation coefficient.

During the training process, preprocessing operations 1601A-C are performed on projection data 1010 (e.g., on a subset of projection data 1010) from a training dataset 700. Various configurations may be used for the preprocessing. For example, in some embodiments, only one of the preprocessing operations 1-3 (1601A-C) is performed on the projection data 1010 before the preprocessed projection data are input to one of the neural networks 1-3 (1501A-C). However, in some embodiments, more than one of the preprocessing operations 1-3 (1601A-C) are performed on the projection data 1010 before the preprocessed projection data are input to one of the neural networks 1-3 (1501A-C). And the multiple preprocessing operations can be performed in parallel (as shown in FIG. 8) or in series (not shown in FIG. 8), where the output of a preprocessing operation is used as an input of another preprocessing operation.

Thus, for example, in some embodiments only preprocessing 1 (1601A) is performed on the projection data 1010 before the preprocessed projection data are input into neural network 1 (1501A). But, in some embodiments, both preprocessing 1 (1601A) and preprocessing 2 (1601B) are performed on the projection data 1010, and the outputs of both preprocessing 1 (1601A) and preprocessing 2 (1601B) are input into neural network 1 (1501A). And, in some embodiments, preprocessing 1 (1601A) is performed on the projection data 1010, the output of preprocessing 1 (1601A) is input into preprocessing 2 (1601B), and the output of preprocessing 2 (1601B) is input into neural network 1 (1501A).

Also, the preprocessing operations may be configured for the types of preliminary scattering data that are accepted by the neural networks that accept the outputs of the preprocessing operations. For example, if neural network 1 (1501A) accepts structure-mask projections as the preliminary scattering data, and if the outputs of preprocessing 1 (1601A) are input into neural network 1 (1501A), then preprocessing 1 (1601A) may be configured for structure-mask projections.

The neural networks 1501A-C accept, as inputs, the outputs of at least some of the preprocessing operations 1601A-C. Depending on the embodiment, each of the neural networks 1501A-C may accept the output of only one of the preprocessing operations 1601A-C, and each of the neural networks 1501A-C may accept the outputs of two or more of the preprocessing operations 1601A-C. For example, in FIG. 8, neural network 1 (1501A) may accept, as inputs, the outputs of one or both of preprocessing 1 (1601A) and preprocessing 2 (1601B), and neural network 2 (1501B) may accept, as inputs, the outputs of one or both of preprocessing 1 (1601A) and preprocessing 2 (1601B).

Based on the inputs, which are projection data 1010 (e.g., a subset of projection data) that have been preprocessed and preliminary scattering data 1103, each of the neural networks 1501A-C outputs respective scatter-distribution data 1105. And scatter-distribution data 1105 define the scatter components (e.g., scatter flux) of the input projection data 1010. For example, based on projection data 1010 (e.g., a subset of projection data) that have been preprocessed and on corresponding preliminary scattering data 1103, neural network 1 (1501A) generates (e.g., infers) scatter-distribution data 1105, which indicate the scatter components (e.g., scatter flux) in the input projection data 1010.

The scatter-distribution data 1105 and corresponding target data 707 (which correspond to the projection data 1010 that were used as the basis of the generation of the scatter-distribution data) are input into one or more loss functions 1601. Some embodiments include only one loss function 1601, and some embodiments include multiple loss function 1601. For example, some embodiments include a respective loss function 1601 for each of the neural networks 1501A-C, and some embodiments include a respective loss function 1601 for a subset of the neural networks 1501A-C (e.g., a respective loss function 1601 for neural networks 1 and 2 (1501A-B) and a respective loss function 1601 for neural network N (1501C)). Thus, a loss function 1601 may have only one corresponding neural network, and a loss function 1601 may have multiple corresponding neural networks.

The one or more loss functions 1601 output respective loss values 1605, which are gradients in this embodiment, based on the scatter-distribution data 1105 and on the target data 707. The respective loss values 1605 (e.g., gradients) are backpropagated through their corresponding neural networks 1501A-C. For example, if each of the neural networks 1501A-C has a respective corresponding loss function 1601, then the respective loss value 1605 of each loss function 1601 is backpropagated through the respective corresponding neural network (of the neural networks 1501A-C) of the loss function 1601.

For example, the backpropagation may use one or more of the following: a steepest descent method (e.g., with variable learning rate, with variable learning rate and momentum, and resilient backpropagation), a quasi-Newton method (e.g., Broyden-Fletcher-Goldfarb-Shanno, one step secant, and Levenberg-Marquardt), or a conjugate gradient method (e.g., Fletcher-Reeves update, Polak-Ribiere update, Powell-Beale restart, and scaled conjugate gradient). And the optimization method by which the backpropagation is performed can use one or more of gradient descent, batch gradient descent, stochastic gradient descent, and mini-batch stochastic gradient descent. Additionally, the optimization method can be accelerated using one or more momentum update techniques in the optimization approach that results in faster convergence rates of stochastic gradient descent in deep networks, including, for example, a Nesterov momentum technique or an adaptive method, such as an Adagrad sub-gradient method, an Adadelta or RMSProp parameter update variation of the Adagrad method, and an Adam adaptive optimization technique. The optimization method can also apply a second-order method by incorporating the Jacobian matrix into an update step.

After the backpropagation is finished, the training process in FIG. 8 can be repeated. The training process can be repeated until predefined stopping criteria, which are used to determine whether the training of the one or more neural networks 1501A-C is complete, are satisfied. For example, the predefined stopping criteria can evaluate whether the new error (e.g., loss value 1605) or the total number of iterations performed exceed predefined values. For example, the stopping criteria can be satisfied if either the new error falls below a predefined threshold or if a maximum number of iterations is reached.

Also, the training processes can be performed for one subset of projection data at a time. Thus, in some embodiments, a single subset of projection data 1010 is preprocessed, the preprocessed subset is input into one or more of the neural networks 1501A-C (which output scatter-distribution data 1105), the scatter-distribution data 1105 and the corresponding target data 707 are input into the loss function 1601 (which outputs a loss value 1605), and the loss value 1605 is backpropagated through the one or more of the neural networks 1501A-C.

Figure 9:
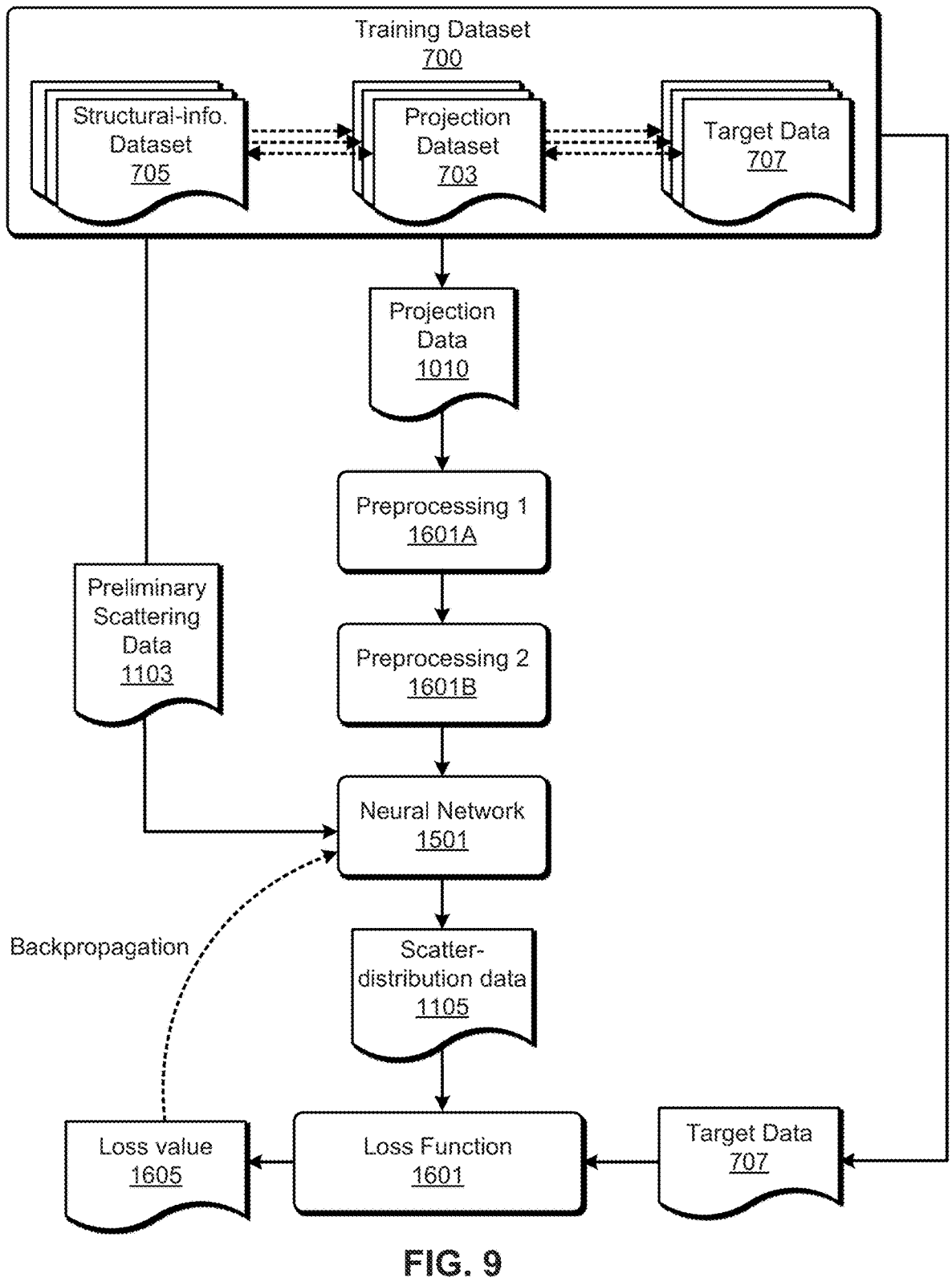
FIG. 9 illustrates the flow of information in an example embodiment of a training process.

FIG. 9 illustrates the flow of information in an example embodiment of a training process. In FIG. 9, a training dataset 700 includes a plurality of projection datasets 703, corresponding structural-information datasets 705, and corresponding target data 707.

During the training process, preprocessing operations 1-2 (1601A-B) are sequentially performed on projection data 1010 (e.g., on a subset of projection data 1010) from a training dataset 700.

The preprocessed projection data (e.g., the preprocessed subset of projection data) and the corresponding preliminary scattering data 1103 are input into a neural network 1501. The neural network 1501 outputs scatter-distribution data 1105 based on the preprocessed projection data and the corresponding preliminary scattering data 1103.

The scatter-distribution data 1105 and corresponding target data 707 (which correspond to the projection data 1010 that were used as the basis of the generation of the scatter-distribution data 1105) are input into a loss function 1601. The loss function 1601 outputs a loss value 1605, which is a gradient in this embodiment, based on the scatter-distribution data 1105 and the target data 707. And the loss value 1605 (e.g., gradient) is backpropagated through the neural network 1501.

After the backpropagation is finished, the training process in FIG. 9 can be repeated (e.g., using the same subset of projection data, using a different subset of projection data).

The training process can be repeated until predefined stopping criteria, which are used to determine whether the training of the neural network 1501 is complete, are satisfied.

Also, like FIG. 8, the training processes in FIG. 9 can be performed for one subset of projection data at a time. Thus, in some embodiments, a single subset of projection data 1010 is preprocessed, the preprocessed subset is input into the neural network 1501 (which outputs scatter-distribution data 1105), the scatter-distribution data 1105 and the target data 707 are input into the loss function 1601 (which outputs a loss value 1605), and the loss value 1605 is backpropagated through the neural network 1501.

Figure 10:
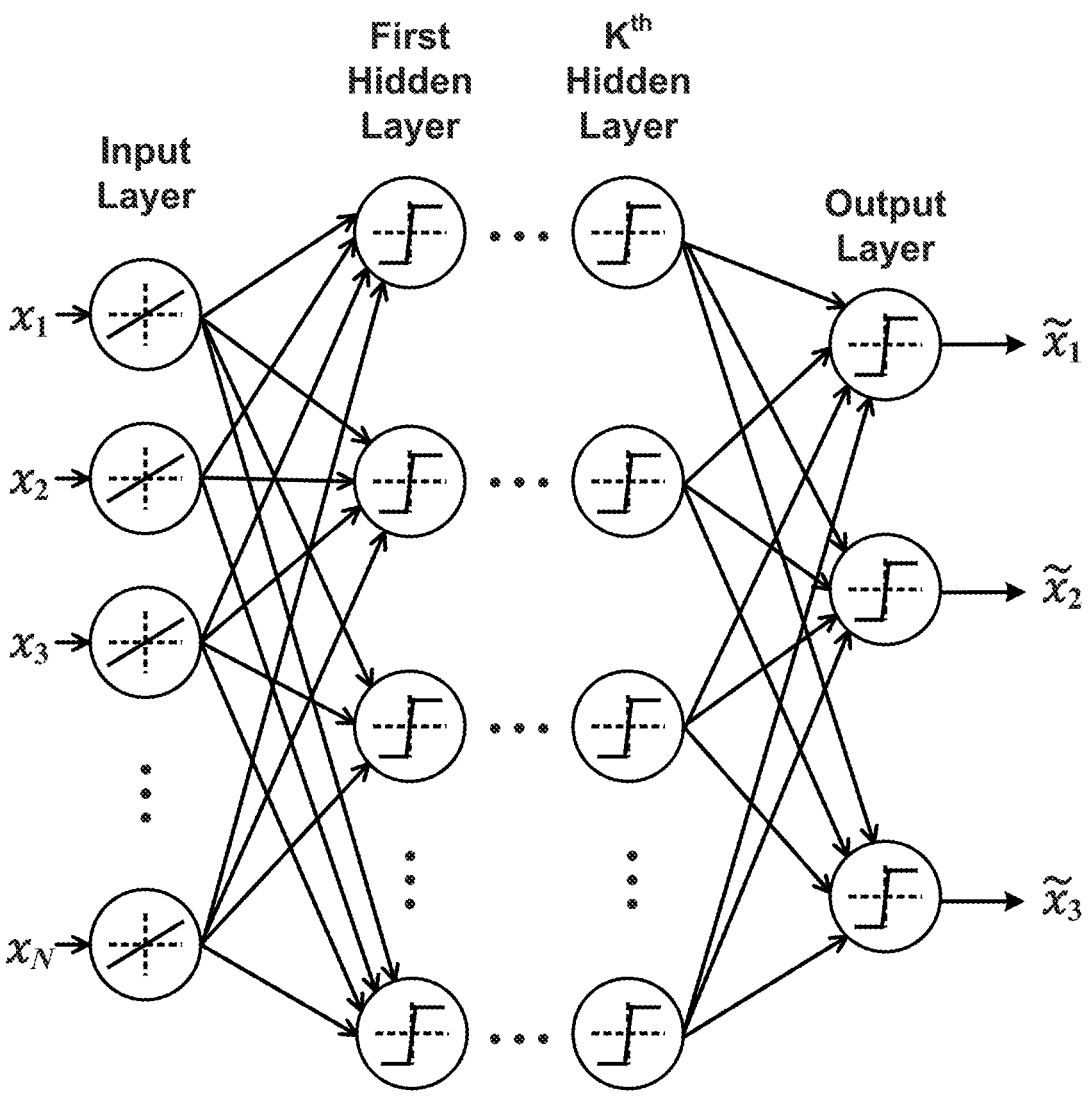
FIG. 10 illustrates an example embodiment of a neural network.

FIG. 10 illustrates an example embodiment of a neural network (e.g., one of the trained neural networks 1501 in FIG. 4). The neural network is an artificial neural network (ANN) having N inputs, K hidden layers, and three outputs. Each layer is made up of nodes (also called neurons), and each node performs a weighted sum of the inputs and compares the result of the weighted sum to a threshold to generate an output. ANNs make up a class of functions for which the members of the class are obtained by varying thresholds, connection weights, or specifics of the architecture, such as the number of nodes or their connectivity. The nodes in an ANN can be referred to as neurons (or as neuronal nodes), and the neurons can have interconnections between the different layers of the ANN system. The simplest ANN has three layers, and is called an autoencoder. The neural network may have more than three layers of neurons, and may have as many output neurons $\tilde{x}_N$ as input neurons. The synapses (i.e., the connections between neurons) store values called "weights" (also interchangeably referred to as "coefficients" or "weighting coefficients") that manipulate the data in the calculations. The outputs of the ANN depend on three types of parameters: (i) the interconnection pattern between the different layers of neurons, (ii) the learning process for updating the weights of the interconnections, and (iii) the activation function that converts a neuron's weighted input to its output activation.

Mathematically, a neuron's network function m(x) can be described as a composition of other functions $n_i(x)$, which can further be described as a composition of other functions. This can be conveniently represented as a network structure, with arrows depicting the dependencies between variables, as shown in FIG. 10. For example, the ANN can use a nonlinear weighted sum, such as $m(x)=K(\Sigma_i w_i n_i(x))$, where K (commonly referred to as the activation function) is some predefined function (e.g., a hyperbolic tangent), and where $w_i$ is the weight of corresponding function $n_i(x)$.

In FIG. 10 (and similarly in FIG. 11), the neurons (i.e., nodes) are depicted by circles around a threshold function. For the non-limiting example shown in FIG. 10, the inputs are depicted as circles around a linear function, and the arrows indicate directed connections between neurons. In certain implementations, the neural network is a feedforward network as exemplified in FIGS. 10 and 11 (e.g., it can be represented as a directed acyclic graph).

The neural network operates to achieve a specific task, such as generating a scatter distribution, by searching within the class of functions F to learn, using a set of observations, to find $m^* \in F$, which solves the specific task in some optimal sense (e.g., the stopping criteria discussed above). For example, in certain implementations, this can be achieved by defining a cost function $C:F \rightarrow \mathbb{R}$ such that, for the optimal solution $m^*$, $C(m^*) \leq C(m) \forall m \in F$ (i.e., no solution has a cost less than the cost of the optimal solution). The cost function is a measure of how far away a particular solution is from an optimal solution to the problem to be solved (e.g., the error). Learning algorithms iteratively search through the solution space to find a function that has the smallest possible cost. In certain implementations, the cost is minimized over a sample of the data (i.e., the training data).

Figure 11:
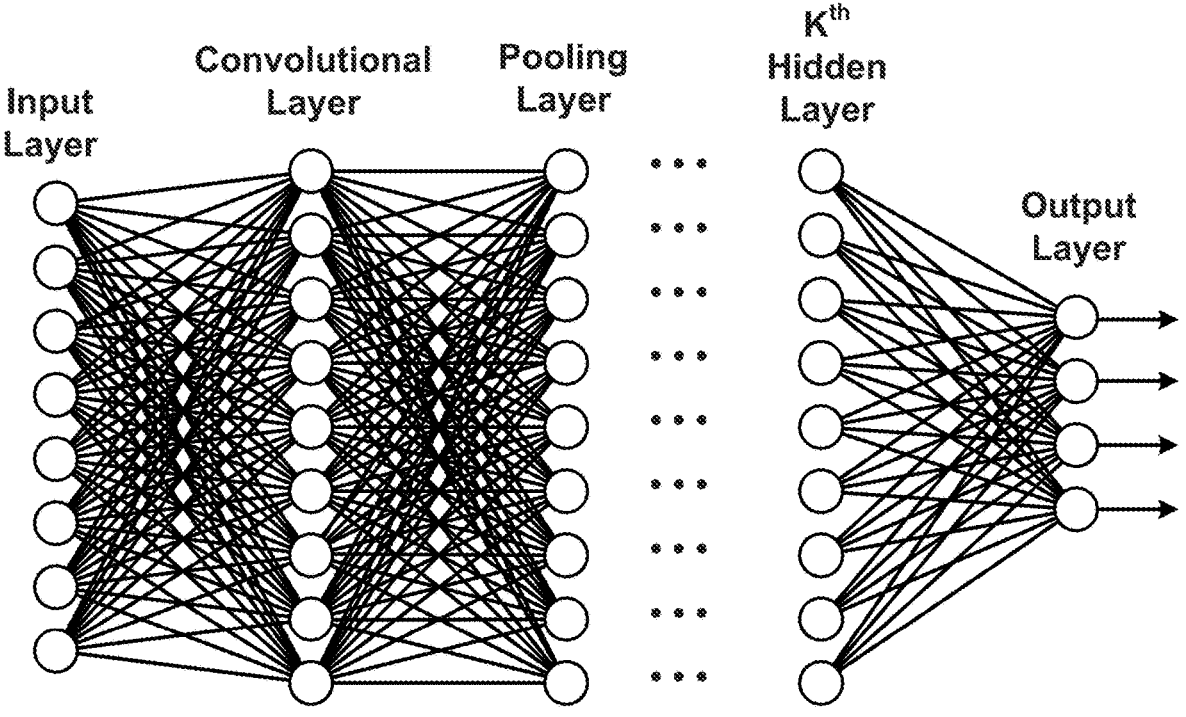
FIG. 11 illustrates an example embodiment of a convolutional neural network (CNN).

In some embodiments, the neural network is a convolutional neural network (CNN), and FIG. 11 shows an example embodiment of a CNN. CNNs use feed-forward ANNs in which the connectivity pattern between neurons can represent convolutions. For example, CNNs can be used for image-processing optimization by using multiple layers of small neuron collections that process portions of the input data (e.g., projection data), called receptive fields. The outputs of these collections can then be tiled so that they overlap. This processing pattern can be repeated over multiple layers having alternating convolution and pooling layers.

FIG. 12 illustrates an example of implementing a convolution layer for one neuronal node of the convolution layer, according to an example embodiment. FIG. 12 shows an example of a 4×4 kernel being applied to map values from an input layer representing a two-dimensional image (e.g., a sinogram) to a first hidden layer, which is a convolution layer. The kernel maps respective 4×4 pixel regions to corresponding neurons of the first hidden layer.

Following a convolution layer, a CNN can include local or global pooling layers, which combine the outputs of neuron clusters in the convolution layers. Additionally, in certain implementations, the CNN can also include various combinations of convolution and fully-connected layers, with pointwise nonlinearity applied at the end of or after each layer.

Figure 13:
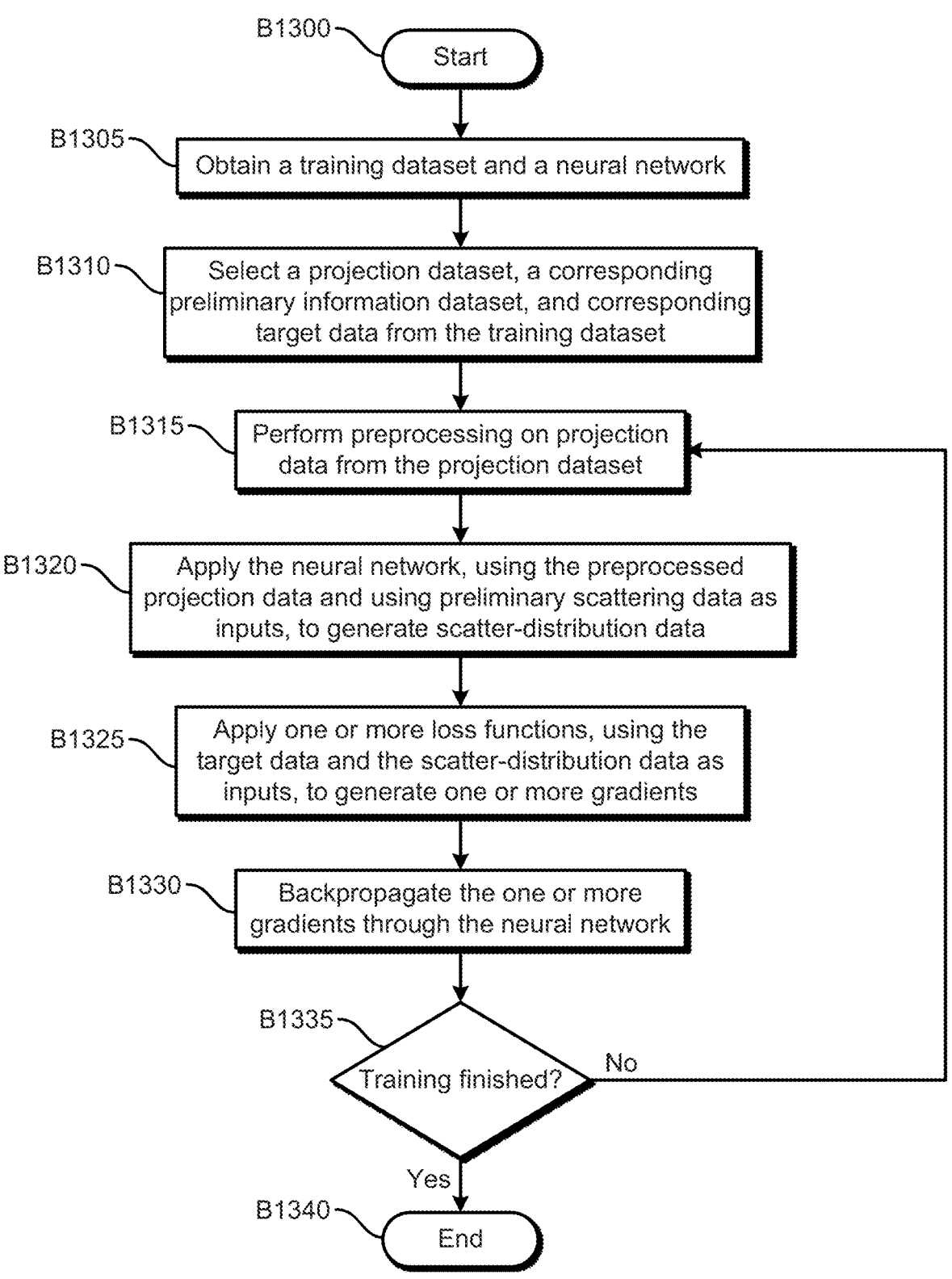
FIG. 13 illustrates an example embodiment of a neural-network training process.

FIG. 13 illustrates an example embodiment of a neural-network training process. Furthermore, although this operational flow is performed by a neural-network-training device, some embodiments of these operational flows are performed by two or more neural-network-training devices or by one or more other specially-configured computing devices.

The flow begins in block B1300 and then moves to block B1305, where a neural-network-training device obtains (e.g., retrieves from storage, receives from another device) a training dataset and a neural network. Next, in block B1310, the neural-network-training device selects a projection dataset, a structural-information dataset, and target data from the training dataset. The projection dataset, the structural-information dataset, and the target data correspond to each other.

The flow then moves to block B11315, where the neural-network-training device performs preprocessing on projection data (detection data) from the projection dataset. The flow then advances to block B1320, where the neural-network-training device applies the neural network, using the preprocessed projection data and using the preliminary scattering data as inputs, to generate scatter-distribution data.

The flow then moves to block B11325, where the neural-network-training device applies one or more loss functions, using the target data and the scatter-distribution data as inputs, to generate one or more gradients.

Next, in block B1330, the neural-network-training device backpropagates the one or more gradients through the neural network.

Then, in block B1335, the neural-network-training device determines if the training of the neural network is finished (e.g., if predefined stopping criteria are satisfied). If the neural-network-training device determines that the training of the neural network is not finished (B1335=No), then the flow returns to block B1315, where the neural-network-training device performs preprocessing on projection data, which may or may not have previously been used in any prior iterations of blocks B1315-B1330.

Additionally, some embodiments use only a single subset of projection data in each iteration of blocks B1315-B1330.

Also, the flow may return to block B1310, where the neural-network-training device selects a projection dataset, a structural-information dataset, and target data from the training dataset. The selected projection dataset, structural-information dataset, and target data may or may not have been previously selected.

If the neural-network-training device determines that the training of the neural network is finished (B11335=Yes), then the flow proceeds to block B11340, where the neural-network-training device stores or outputs the trained neural network, and the flow ends.

Also, the neural-network-training device may perform the operations in FIG. 13 for each neural network of a plurality of neural networks. And each of the neural networks may have a respective training dataset. Also, each neural network's training dataset may be unique to that neural network.

Figure 14:
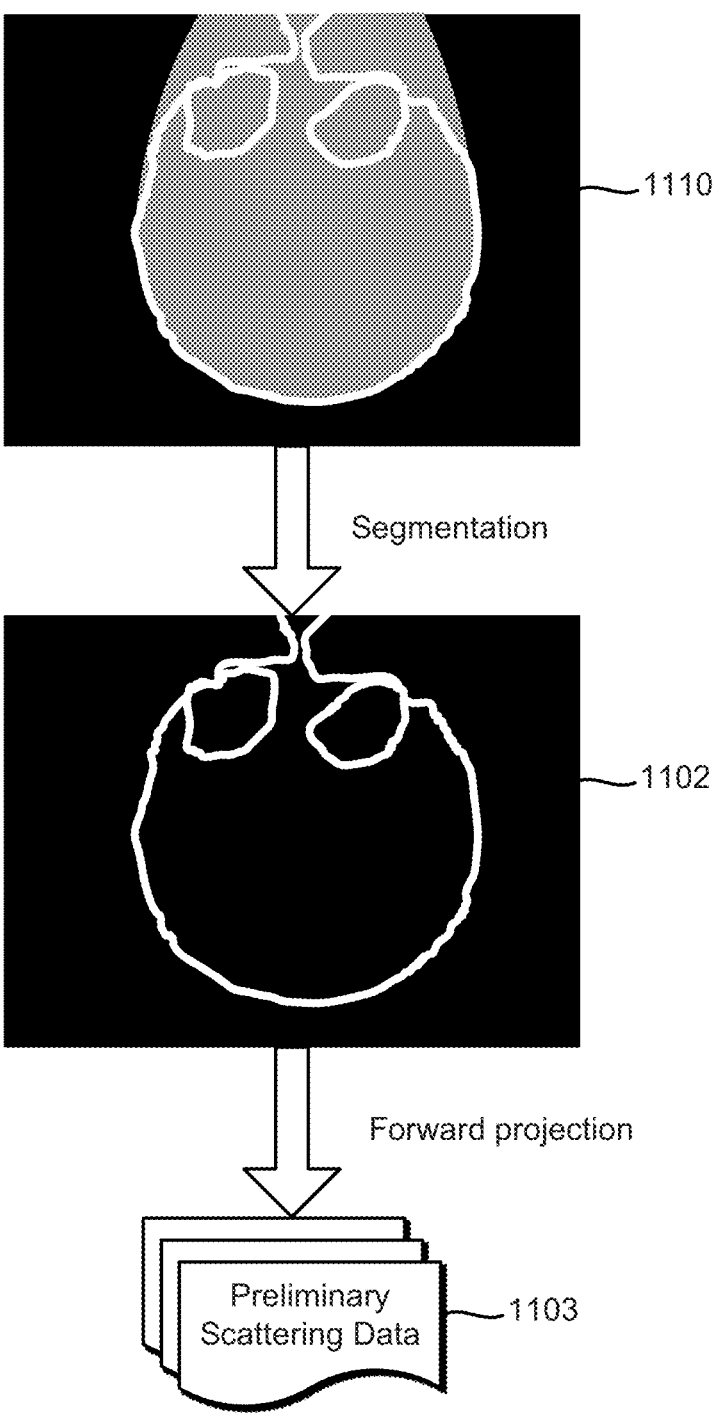
FIG. 14 illustrates an example embodiment of a structure mask and structure-mask projections.

FIG. 14 illustrates an example embodiment of a structure mask and structure-mask projections. The structure mask 1102 is generated by segmenting a reconstructed image 1110, which is defined by reconstructed-image data. In this example, the structure mask 1102 is generated by applying a threshold (e.g., in Hounsfield Units) to the reconstructed image 1110 to identify the pixels (or voxels) that have values that are above the threshold. The pixels that have values that are above the threshold are used to form the structure mask 1102. Then forward projection is performed on the structure mask 1102 (which is defined in the image space) to generate preliminary scattering data 1103, which include one or more structure-mask projections 1103 (which are defined in the projection space) in this embodiment. To generate multiple structure-mask projections 1103, the forward projection is performed multiple times on the structure mask 1102.

Also, in some embodiments, such as embodiments that identify softer materials (e.g., soft tissues), other segmentation techniques are used in addition to, or in alternative to, HU thresholds.

Figure 15:
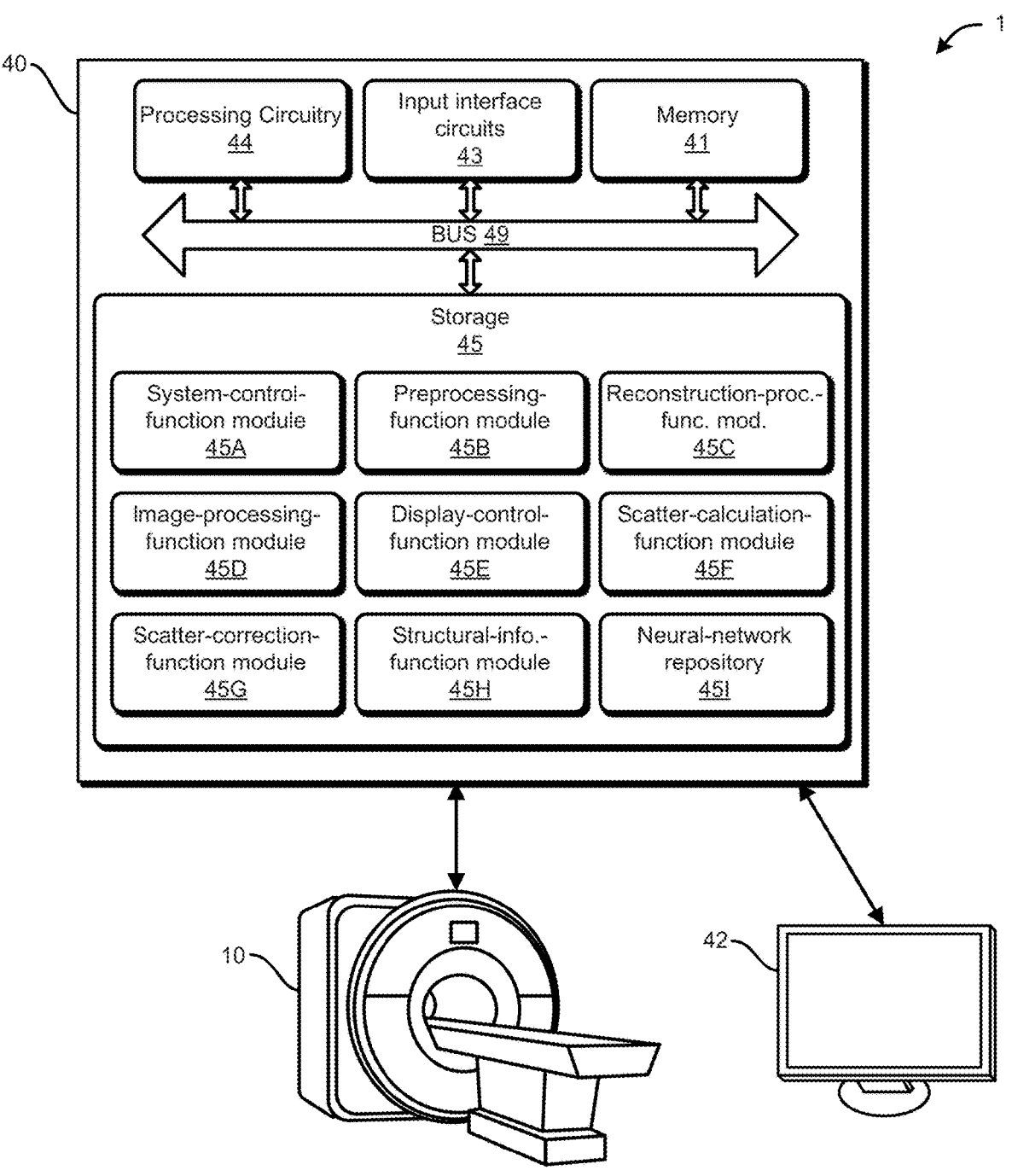
FIG. 15 illustrates an example embodiment of a medical-imaging system.

FIG. 15 illustrates an example embodiment of a medical-imaging system. In this example embodiment, the medical-imaging system realizes an X-ray CT apparatus 1.

X-ray CT apparatus 1 includes a console 40, which is a specially-configured computing device; gantry 10; and a display 42.

The console 40 includes processing circuitry 44, one or more input interface circuits 43, memory 41, and storage 45. Also, the hardware components of the console 40 communicate via one or more buses 49 or other electrical connections. Examples of buses 49 include a universal serial bus (USB), an IEEE 1394 bus, a PCI bus, an Accelerated Graphics Port (AGP) bus, a Serial AT Attachment (SATA) bus, and a Small Computer System Interface (SCSI) bus.

The one or more input interface circuits 43 include communication components (e.g., a GPU, a network-interface controller) that communicate with the display 42, the gantry 10, a network (not illustrated), and other input or output devices (not illustrated), which may include a keyboard, a mouse, a printing device, a touch screen, a light pen, an optical-storage device, a scanner, a microphone, a drive, a joystick, and a control pad.

The storage 45 includes one or more computer-readable storage media. As used herein, a computer-readable storage medium refers to a computer-readable medium that includes an article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage 45, which may include both ROM and RAM, can store computer-readable data or computer-executable instructions. Also, the storage 45 is an example of a storage unit.

The console 40 additionally includes a system-control-function module 45A, a preprocessing-function module 45B, a reconstruction-processing-function module 45C, an image-processing-function module 45D, a display-control-function module 45E, a scatter-calculation-function module 45F, a scatter-correction-function module 45G, and a structural-information-function module 45H. A module includes logic, computer-readable data, or computer-executable instructions. In the embodiment shown in FIG. 15, the modules are implemented in software (e.g., Assembly, C, C++, C #, Java, BASIC, Perl, Visual Basic). However, in some embodiments, the modules are implemented in hardware (e.g., customized circuitry) or, alternatively, a combination of software and hardware. When the modules are implemented, at least in part, in software, then the software can be stored in the storage 45. Also, in some embodiments, the console 40 includes additional or fewer modules, the modules are combined into fewer modules, or the modules are divided into more modules. Furthermore, the storage 45 includes a neural-network repository 451, which stores neural networks (or other machine-learning models).

The system-control-function module 45A includes instructions that cause the applicable components (e.g., the processing circuitry 44, the input interface circuit 43, the memory 41) of the console 40 to control various functions of the gantry 10 and to perform various input and output functions. For example, some embodiments of the system-control-function module 45A include instructions that cause the applicable components of the console 40 to perform at least some of the operations that are described in block B510 in FIG. 5, in blocks B605-B615 in FIG. 6, and in blocks B705-B710 in FIG. 7. Also, the system-control-function module 45A may cause the applicable components of the console 40 to realize the system-control function 441 in FIG. 1. And the applicable components operating according to the system-control-function module 45A realize an example of a control unit.

The preprocessing-function module 45B includes instructions that cause the applicable components (e.g., the processing circuitry 44, the memory 41) of the console 40 to perform pre-processing operations on projection data. For example, some embodiments of the preprocessing-function module 45B include instructions that cause the applicable components of the console 40 to perform at least some of the operations that are described in blocks B520 and B560 in FIG. 5, in blocks B620 and B640 in FIG. 6, and in blocks B715 and B765 in FIG. 7. Also, the preprocessing-function module 45B may cause the applicable components of the console 40 to realize the pre-processing function 442. And the applicable components operating according to the pre-processing-function module 45B realize an example of a preprocessing unit.

The reconstruction-processing-function module 45C includes instructions that cause the applicable components (e.g., the processing circuitry 44, the memory 41) of the console 40 to perform a reconstruction process (e.g., reconstruction process 201A or reconstruction process 201B in FIG. 4) on projection data (e.g., detection data, preprocessed projection data, scatter-corrected projection data) to generate reconstructed-image data (CT-image data). For example, some embodiments of the reconstruction-processing-function module 45C include instructions that cause the applicable components of the console 40 to perform at least some of the operations that are described in blocks B520 and B560 in FIG. 5, in blocks B620 and B640 in FIG. 6, and in blocks B715 and B765 in FIG. 7. Also, the reconstruction-processing-function module 45C may cause the applicable components of the console 40 to realize the reconstruction-processing function 443 in FIG. 1. And the applicable components operating according to the reconstruction-processing-function module 45C realize an example of a reconstruction processing unit.

The image-processing-function module 45D includes instructions that cause the applicable components (e.g., the processing circuitry 44, the memory 41) of the console 40 to generate tomographic-image data from reconstructed-image data (e.g., scatter-corrected reconstructed-image data). For example, some embodiments of the image-processing-function module 45D include instructions that cause the applicable components of the console 40 to perform at least some of the operations that are described in block B645 in FIG. 6 and in block B770 in FIG. 7. Also, the image-processing-function module 45D may cause the applicable components of the console 40 to realize the image-processing function 444 in FIG. 1. And the applicable components operating according to the image-processing-function module 45D realize an example of an image processing unit.

The display-control-function module 45E includes instructions that cause the applicable components (e.g., the processing circuitry 44, the input interface circuit 43, the memory 41) of the console 40 to display images on the display 42. For example, some embodiments of the display-control-function module 45E include instructions that cause the applicable components of the console 40 to perform at least some of the operations that are described in block B645 in FIG. 6 and in block B770 in FIG. 7. Also, the display-control-function module 45E may cause the applicable components of the console 40 to realize the display-control function 445 in FIG. 1. And the applicable components operating according to the display-control-function module 45E realize an example of a display-control unit.

The scatter-calculation-function module 45F includes instructions that cause the applicable components (e.g., the processing circuitry 44, the memory 41) of the console 40 to use one or more trained neural networks (e.g., the one or more trained neural networks 1501 in FIG. 4) to generate scatter-distribution data, which indicate (e.g., estimate) the scatter components in projection data, based on the projection data and on preliminary scattering data. For example, some embodiments of the scatter-calculation-function module 45F include instructions that cause the applicable components of the console 40 to perform at least some of the operations that are described in block B540 in FIG. 5, in block B630 in FIG. 6, and in blocks B735-B745 in FIG. 7. Also, the scatter-calculation-function module 45F may cause the applicable components of the console 40 to realize the scatter-calculation function 446 in FIG. 1. And the applicable components operating according to the scatter-calculation-function module 45F realize an example of a scatter-calculation unit.

The scatter-correction-function module 45G includes instructions that cause the applicable components (e.g., the processing circuitry 44, the memory 41) of the console 40 to generate scatter-corrected projection data (e.g., to perform the correction process 205 in FIG. 4) based on scatter-distribution data and on projection data. For example, some embodiments of the scatter-correction-function module 45G include instructions that cause the applicable components of the console 40 to perform at least some of the operations that are described in block B550 in FIG. 5, in block B640 in FIG. 6, and in blocks B750-B760 in FIG. 7. Also, the scatter-correction-function module 45G may cause the applicable components of the console 40 to realize the scatter-correction function 447 in FIG. 1. And the applicable components operating according to the scatter-correction-function module 45G realize an example of a scatter-correction unit.

The structural-information-function module 45H includes instructions that cause the applicable components (e.g., the processing circuitry 44, the memory 41) of the console 40 to generate preliminary scattering data based on reconstructed-image data. For example, some embodiments of the structural-information-function module 45H include instructions that cause the applicable components of the console 40 to perform at least some of the operations that are described in block B530 in FIG. 5, in block B625 in FIG. 6, and in blocks B720-B730 in FIG. 7. Also, the structural-information-function module 45H may cause the applicable components of the console 40 to realize the structural-information function 448 in FIG. 1. And the applicable components operating according to the structural-information-function module 45H realize an example of a structural-information unit.

Figure 16:
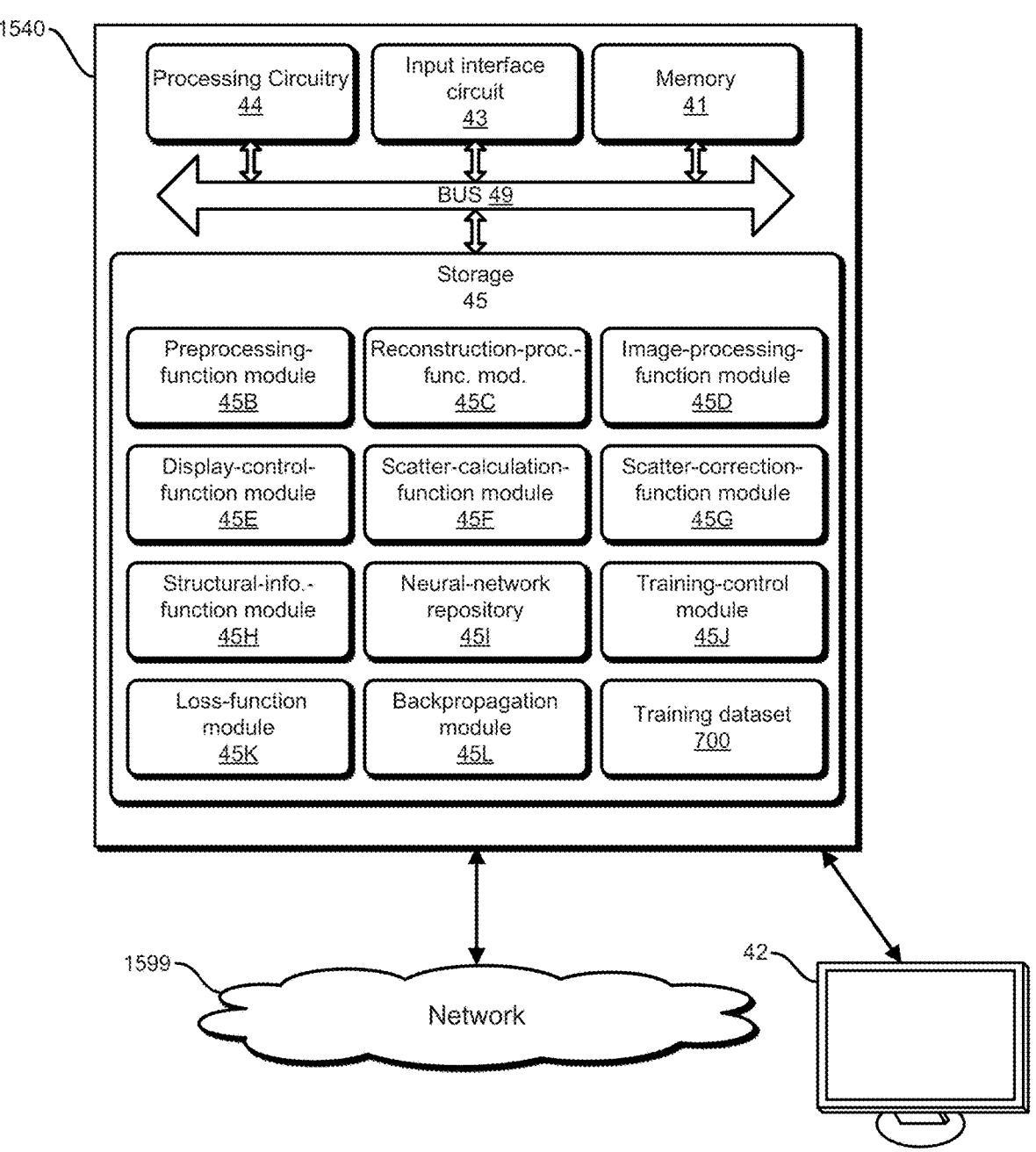
FIG. 16 illustrates an example embodiment of a neural-network-training device.

FIG. 16 illustrates an example embodiment of a neural-network-training device. The components of the neural-network-training device 1540 that have names and reference numbers that are identical to components of the console 40 are identical or similar to such components of the console 40, and, accordingly, further descriptions of such components are not included.

The neural-network-training device 1540 includes a training-control module 45J, a loss-function module 45K, a backpropagation module 45L, and a training dataset 700 (e.g., as illustrated in FIG. 8 or FIG. 9).

The training-control module 45J includes instructions that cause the applicable components (e.g., the processing circuitry 44, the memory 41) of the neural-network-training device 1540 to train one or more neural networks to generate scatter-distribution data based on input projection data and on input preliminary scattering data and to store the neural networks in the neural-network repository 451. Also, to perform these operations, the training-control module 45J invokes other modules (e.g., the preprocessing-function module 45B, the reconstruction-processing-function module 45C, the scatter-calculation-function module 45F, the scatter-correction-function module 45G, the loss-function module 45K, the backpropagation module 45L). For example, some embodiments of the training-control module 45J include instructions that cause the applicable components of the neural-network-training device 1540 to perform the overall flow that is described in FIG. 13 (again, note that the training-control module 45J invokes other modules to perform some of these operations). And the applicable components operating according to the training-control module 45J realize an example of a training-control unit.

The loss-function module 45K includes instructions that cause the applicable components (e.g., the processing circuitry 44, the memory 41) of the neural-network-training device 1540 to implement a loss function (e.g., loss function 1601 in FIG. 8, loss function 1601 in FIG. 9) that outputs a loss value (e.g., a gradient) based on input scatter-distribution data and on input target data. For example, some embodiments of the loss-function module 45K include instructions that cause the applicable components of the neural-network-training device 1540 to perform at least some of the operations that are described in B11325 in FIG. 13. And the applicable components operating according to the loss-function module 45K realize an example of a loss-function unit.

The backpropagation module 45L includes instructions that cause the applicable components (e.g., the processing circuitry 44, the memory 41) of the neural-network-training device 1540 to backpropagate loss values through neural networks. For example, some embodiments of the backpropagation module 45L include instructions that cause the applicable components of the neural-network-training device 1540 to perform at least some of the operations that are described in B1330 in FIG. 13. And the applicable components operating according to the backpropagation module 45L realize an example of a backpropagation unit.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Thus, the scope of the claims is not limited to the above-described embodiments and includes various modifications and equivalent arrangements.

The invention claimed is:

1. A method for performing X-ray scatter correction for computed tomography (CT) images, the method comprising:
   obtaining a set of projection data acquired from a CT scan of an object;
   generating, based on the set of projection data, one or more sets of preliminary scattering data, wherein the one or more sets of preliminary scattering data are different from the set of projection data; and
   inputting the obtained set of projection data and the generated one or more sets of preliminary scattering data into a trained machine-learning model, wherein, based on the set of projection data and on the one or more sets of preliminary scattering data, the trained machine-learning model outputs scatter-distribution data.

2. The method of claim 1, wherein generating the one or more sets of preliminary scattering data includes:
   generating a reconstructed image of the object based on the set of projection data, and
   wherein generating the one or more sets of preliminary scattering data is based on the reconstructed image of the object.

3. The method of claim 1,
   wherein the set of projection data includes subsets of projection data that were acquired at a plurality of detection angles,
   wherein at least some of the plurality of detection angles are different from other detection angles of the plurality of detection angles,
   wherein each subset of the subsets of projection data was acquired at a respective detection angle of the plurality of detection angles,
   wherein the respective detection angle of each subset of the subsets of projection data is different from the respective detection angle of at least one other subset of the subsets of projection data, and wherein the one or more sets of preliminary scattering data include a respective set of preliminary scattering data for each detection angle.

4. The method of claim 3, wherein the trained machine-learning model outputs respective scatter-distribution data for each subset of the subsets of projection data.

5. The method of claim 4, further comprising:

correcting each subset of the subsets of projection data based on the respective scatter-distribution data of the subset.

6. The method of claim 1, wherein the one or more sets of preliminary scattering data include one or more sets of first-scatter distributions.

7. The method of claim 1, wherein the one or more sets of preliminary scattering data include one or more structure-mask projections.

8. An X-ray imaging apparatus comprising:

an X-ray tube;

an X-ray detector; and one or more memories and processing circuitry configured to obtain a set of projection data acquired from a computed tomography (CT) scan of an object;

generate, based on the set of projection data, one or more sets of preliminary scattering data, wherein the one or more sets of preliminary scattering data are different from the set of projection data; and input the obtained set of projection data and the generated one or more sets of preliminary scattering data into a trained neural network, wherein, based on the set of projection data and on the one or more sets of preliminary scattering data, the trained neural network outputs scatter-distribution data.

9. The X-ray imaging apparatus of claim 8, wherein, to generate the one or more sets of preliminary scattering data, the one or more memories and processing circuitry are further configured to generate a reconstructed image of the object based on the set of projection data, and generate the one or more sets of preliminary scattering data based on the reconstructed image of the object.

10. The X-ray imaging apparatus of claim 8, wherein the set of projection data includes subsets of projection data that were acquired at a plurality of detection angles, wherein at least some of the plurality of detection angles are different from other detection angles of the plurality of detection angles, wherein each subset of the subsets of projection data was acquired at a respective detection angle of the plurality of detection angles, wherein the respective detection angle of each subset of the subsets of projection data is different from the respective detection angle of at least one other subset of the subsets of projection data, and wherein the one or more sets of preliminary scattering data include a respective set of preliminary scattering data for each detection angle.

11. The X-ray imaging apparatus of claim 10, wherein the trained neural network outputs respective scatter-distribution data for each subset of the subsets of projection data.

12. The X-ray imaging apparatus of claim 11, wherein the one or more memories and processing circuitry are further configured to correct each subset of the subsets of projection data based on the respective scatter-distribution data of the subset.

13. The X-ray imaging apparatus of claim 10, wherein the one or more sets of preliminary scattering data include one or more sets of first-scatter distributions.

14. The X-ray imaging apparatus of claim 10, wherein the one or more sets of preliminary scattering data include one or more structure-mask projections.

15. A medical image processing apparatus comprising:

one or more memories and processing circuitry configured to obtain a set of projection data acquired from a computed tomography (CT) scan of an object;

generate, based on the set of projection data, one or more sets of preliminary scattering data, wherein the one or more sets of preliminary scattering data are different from the set of projection data; and input the obtained set of projection data and the generated one or more sets of preliminary scattering data into a trained neural network, wherein, based on the set of projection data and on the one or more sets of preliminary scattering data, the trained neural network outputs scatter-distribution data.

16. The medical image processing apparatus of claim 15, wherein the trained neural network operates in a projection space, and wherein the projection data in the set of projection data are defined in the projection space.

17. The medical image processing apparatus of claim 15, wherein the one or more sets of preliminary scattering data include one or more sets of first-scatter distributions or one or more structure-mask projections.

18. The medical image processing apparatus of claim 15, wherein the one or more sets of preliminary scattering data are defined in a projection space, and wherein the projection data in the set of projection data are defined in the projection space.

19. The medical image processing apparatus of claim 15, wherein, to generate the one or more sets of preliminary scattering data, the one or more memories and processing circuitry are further configured to generate a reconstructed image of the object based on the set of projection data, and generate the one or more sets of preliminary scattering data based on the reconstructed image of the object.

20. The medical image processing apparatus of claim 19, wherein the set of projection data includes subsets of projection data that were acquired at a plurality of detection angles, wherein at least some of the plurality of detection angles are different from other detection angles of the plurality of detection angles, wherein each subset of the subsets of projection data was acquired at a respective detection angle of the plurality of detection angles, wherein the respective detection angle of each subset of the subsets of projection data is different from the respective detection angle of at least one other subset of the subsets of projection data, and wherein the one or more sets of preliminary scattering data include a respective set of preliminary scattering data for each detection angle.

* * * * *